(12) United States Patent
Abolfathi

(10) Patent No.: US 8,712,078 B2
(45) Date of Patent: *Apr. 29, 2014

(54) HEADSET SYSTEMS AND METHODS

(75) Inventor: Amir A. Abolfathi, Woodside, CA (US)

(73) Assignee: Sonitus Medical, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/572,189

(22) Filed: Aug. 10, 2012

(65) Prior Publication Data

US 2013/0034238 A1 Feb. 7, 2013

Related U.S. Application Data

(63) Continuation of application No. 12/032,226, filed on Feb. 15, 2008, now Pat. No. 8,270,637.

(51) Int. Cl.
*H04R 25/00* (2006.01)

(52) U.S. Cl.
USPC ........... 381/151; 381/312; 381/315; 381/322; 381/326; 381/328; 381/380; 600/25; 600/300; 600/301; 455/41.2; 455/100

(58) Field of Classification Search
USPC ......... 381/151, 312, 315, 322, 326, 328, 380; 600/25, 300, 301; 455/41.2, 100
See application file for complete search history.

(56) References Cited

U.S. PATENT DOCUMENTS

| | | | |
|---|---|---|---|
| 2,045,404 A | 6/1936 | Nicholides | |
| 2,161,169 A | 6/1939 | Jefferis | |
| 2,318,872 A | 5/1943 | Madiera | |
| 2,977,425 A | 3/1961 | Cole | |
| 2,995,633 A | 8/1961 | Puharich et al. | |
| 3,156,787 A | 11/1964 | Puharich et al. | |
| 3,170,993 A | 2/1965 | Puharich et al. | |
| 3,267,931 A | 8/1966 | Puharich et al. | |
| 3,325,743 A | 6/1967 | Blum | |
| 3,787,641 A | 1/1974 | Santori | |
| 3,894,196 A | 7/1975 | Briskey | |
| 3,985,977 A | 10/1976 | Beaty et al. | |
| 4,025,732 A | 5/1977 | Traunmuller | |
| 4,150,262 A | 4/1979 | Ono | |
| 4,498,461 A | 2/1985 | Hakansson | |

(Continued)

FOREIGN PATENT DOCUMENTS

| | | |
|---|---|---|
| EP | 0715838 A2 | 6/1996 |
| EP | 0824889 A1 | 2/1998 |

(Continued)

OTHER PUBLICATIONS

"Special Forces Smart Noise Cancellation Ear Buds with Built-In GPS," http://www.gizmag.com/special-forces-smart-noise-cancellation-ear-buds-with-built-in-gps/9423/, 2 pages, 2008.

(Continued)

*Primary Examiner* — Long K Tran
(74) *Attorney, Agent, or Firm* — Levine Bagade Han LLP

(57) ABSTRACT

A wireless headset is adapted to communicate with a sound source such as a music player or a cell phone or a suitable audio or sound communicated through a one-way or two-way communication device. The headset includes a mouth wearable communicator; and a linking unit coupled to the mouth wearable communicator, the linking unit adapted to communicate with the sound source.

18 Claims, 24 Drawing Sheets

(56) References Cited

U.S. PATENT DOCUMENTS

| | | | |
|---|---|---|---|
| 4,511,330 A | 4/1985 | Smiley et al. |
| 4,591,668 A | 5/1986 | Iwata |
| 4,612,915 A | 9/1986 | Hough et al. |
| 4,642,769 A | 2/1987 | Petrofsky |
| 4,738,268 A | 4/1988 | Kipnis |
| 4,817,044 A | 3/1989 | Ogren |
| 4,832,033 A | 5/1989 | Maher et al. |
| 4,920,984 A | 5/1990 | Furumichi et al. |
| 4,982,434 A | 1/1991 | Lenhardt et al. |
| 5,012,520 A | 4/1991 | Steeger |
| 5,033,999 A | 7/1991 | Mersky |
| 5,047,994 A | 9/1991 | Lenhardt et al. |
| 5,060,526 A | 10/1991 | Barth et al. |
| 5,082,007 A | 1/1992 | Adell |
| 5,233,987 A | 8/1993 | Fabian et al. |
| 5,323,468 A | 6/1994 | Bottesch |
| 5,325,436 A | 6/1994 | Soli et al. |
| 5,372,142 A | 12/1994 | Madsen et al. |
| 5,402,496 A | 3/1995 | Soli et al. |
| 5,403,262 A | 4/1995 | Gooch |
| 5,447,489 A | 9/1995 | Issalene et al. |
| 5,455,842 A | 10/1995 | Merskey et al. |
| 5,460,593 A | 10/1995 | Mersky et al. |
| 5,546,459 A | 8/1996 | Sih et al. |
| 5,558,618 A | 9/1996 | Maniglia |
| 5,565,759 A | 10/1996 | Dunstan |
| 5,616,027 A | 4/1997 | Jacobs et al. |
| 5,624,376 A | 4/1997 | Ball et al. |
| 5,661,813 A | 8/1997 | Shimauchi et al. |
| 5,668,883 A | 9/1997 | Abe et al. |
| 5,706,251 A | 1/1998 | May |
| 5,760,692 A | 6/1998 | Block |
| 5,800,336 A | 9/1998 | Ball et al. |
| 5,812,496 A | 9/1998 | Peck |
| 5,828,765 A | 10/1998 | Gable |
| 5,902,167 A | 5/1999 | Filo et al. |
| 5,914,701 A | 6/1999 | Gersheneld et al. |
| 5,961,443 A | 10/1999 | Rastatter et al. |
| 5,984,681 A | 11/1999 | Huang |
| 6,029,558 A | 2/2000 | Stevens et al. |
| 6,047,074 A | 4/2000 | Zoels et al. |
| 6,068,590 A | 5/2000 | Brisken |
| 6,072,884 A | 6/2000 | Kates |
| 6,072,885 A | 6/2000 | Stockham, Jr. et al. |
| 6,075,557 A | 6/2000 | Holliman et al. |
| 6,115,477 A | 9/2000 | Filo et al. |
| 6,118,882 A | 9/2000 | Haynes |
| 6,171,229 B1 | 1/2001 | Kroll et al. |
| 6,223,018 B1 | 4/2001 | Fukumoto et al. |
| 6,239,705 B1 | 5/2001 | Glen |
| 6,333,269 B2 | 12/2001 | Naito et al. |
| 6,377,693 B1 | 4/2002 | Lippa et al. |
| 6,394,969 B1 | 5/2002 | Lenhardt |
| 6,504,942 B1 | 1/2003 | Hong et al. |
| 6,538,558 B2 | 3/2003 | Sakazume et al. |
| 6,585,637 B2 | 7/2003 | Brillhart et al. |
| 6,631,197 B1 | 10/2003 | Taenzer |
| 6,633,747 B1 | 10/2003 | Reiss |
| 6,682,472 B1 | 1/2004 | Davis |
| 6,754,472 B1 | 6/2004 | Williams et al. |
| 6,778,674 B1 | 8/2004 | Panasik et al. |
| 6,826,284 B1 | 11/2004 | Benesty et al. |
| 6,885,753 B2 | 4/2005 | Bank |
| 6,917,688 B2 | 7/2005 | Yu et al. |
| 6,941,952 B1 | 9/2005 | Rush, III |
| 6,954,668 B1 | 10/2005 | Cuozzo |
| 6,985,599 B2 | 1/2006 | Asnes |
| 7,003,099 B1 | 2/2006 | Zhang et al. |
| 7,033,313 B2 | 4/2006 | Lupin et al. |
| 7,035,415 B2 | 4/2006 | Belt et al. |
| 7,074,222 B2 | 7/2006 | Westerkull |
| 7,076,077 B2 | 7/2006 | Atsumi et al. |
| 7,099,822 B2 | 8/2006 | Zangi |
| 7,162,420 B2 | 1/2007 | Zangi et al. |
| 7,171,003 B1 | 1/2007 | Venkatesh et al. |
| 7,171,008 B2 | 1/2007 | Elko |
| 7,174,022 B1 | 2/2007 | Zhang et al. |
| 7,206,423 B1 | 4/2007 | Feng et al. |
| 7,246,058 B2 | 7/2007 | Burnett |
| 7,258,533 B2 | 8/2007 | Tanner et al. |
| 7,269,266 B2 | 9/2007 | Anjanappa et al. |
| 7,271,569 B2 | 9/2007 | Oglesbee |
| 7,310,427 B2 | 12/2007 | Retchin et al. |
| 7,329,226 B1 | 2/2008 | Ni et al. |
| 7,331,349 B2 | 2/2008 | Brady et al. |
| 7,333,624 B2 | 2/2008 | Husung |
| 7,361,216 B2 | 4/2008 | Kangas et al. |
| 7,409,070 B2 | 8/2008 | Pitulia |
| 7,486,798 B2 | 2/2009 | Anjanappa et al. |
| 7,520,851 B2 | 4/2009 | Davis et al. |
| 7,522,738 B2 | 4/2009 | Miller, III |
| 7,522,740 B2 | 4/2009 | Julstrom et al. |
| 7,844,070 B2 | 11/2010 | Abolfathi |
| 8,270,637 B2 * | 9/2012 | Abolfathi ..................... 381/151 |
| 2001/0003788 A1 | 6/2001 | Ball et al. |
| 2001/0051776 A1 | 12/2001 | Lenhardt |
| 2002/0026091 A1 | 2/2002 | Leysieffer |
| 2002/0071581 A1 | 6/2002 | Leysieffer et al. |
| 2002/0077831 A1 | 6/2002 | Numa |
| 2002/0122563 A1 | 9/2002 | Schumaier |
| 2002/0173697 A1 | 11/2002 | Lenhardt |
| 2003/0059078 A1 | 3/2003 | Downs et al. |
| 2003/0091200 A1 | 5/2003 | Pompei |
| 2003/0212319 A1 | 11/2003 | Magill |
| 2004/0057591 A1 | 3/2004 | Beck et al. |
| 2004/0131200 A1 | 7/2004 | Davis |
| 2004/0141624 A1 | 7/2004 | Davis et al. |
| 2004/0202339 A1 | 10/2004 | O'Brien, Jr. et al. |
| 2004/0202344 A1 | 10/2004 | Anjanappa et al. |
| 2004/0243481 A1 | 12/2004 | Bradbury et al. |
| 2004/0247143 A1 | 12/2004 | Lantrua et al. |
| 2005/0037312 A1 | 2/2005 | Uchida |
| 2005/0067816 A1 | 3/2005 | Buckman |
| 2005/0070782 A1 | 3/2005 | Brodkin |
| 2005/0129257 A1 | 6/2005 | Tamura |
| 2005/0196008 A1 | 9/2005 | Anjanappa et al. |
| 2005/0241646 A1 | 11/2005 | Sotos et al. |
| 2006/0008106 A1 | 1/2006 | Harper |
| 2006/0025648 A1 | 2/2006 | Lupin et al. |
| 2006/0064037 A1 | 3/2006 | Shalon et al. |
| 2006/0079291 A1 | 4/2006 | Granovetter et al. |
| 2006/0167335 A1 | 7/2006 | Park et al. |
| 2006/0270467 A1 | 11/2006 | Song et al. |
| 2006/0275739 A1 | 12/2006 | Ray |
| 2007/0010704 A1 | 1/2007 | Pitulia |
| 2007/0036370 A1 | 2/2007 | Granovetter et al. |
| 2007/0041595 A1 | 2/2007 | Carazo et al. |
| 2007/0142072 A1 | 6/2007 | Lassally |
| 2007/0230713 A1 | 10/2007 | Davis |
| 2007/0242835 A1 | 10/2007 | Davis |
| 2007/0265533 A1 | 11/2007 | Tran |
| 2007/0276270 A1 | 11/2007 | Tran |
| 2007/0280491 A1 | 12/2007 | Abolfathi |
| 2007/0280492 A1 | 12/2007 | Abolfathi |
| 2007/0280493 A1 | 12/2007 | Abolfathi |
| 2007/0280495 A1 | 12/2007 | Abolfathi |
| 2007/0286440 A1 | 12/2007 | Abolfathi et al. |
| 2007/0291972 A1 | 12/2007 | Abolfathi et al. |
| 2008/0019542 A1 | 1/2008 | Menzel et al. |
| 2008/0019557 A1 | 1/2008 | Bevirt et al. |
| 2008/0021327 A1 | 1/2008 | El-Bialy et al. |
| 2008/0064993 A1 | 3/2008 | Abolfathi et al. |
| 2008/0070181 A1 | 3/2008 | Abolfathi et al. |
| 2008/0304677 A1 | 12/2008 | Abolfathi et al. |
| 2009/0028352 A1 | 1/2009 | Petroff |
| 2009/0052698 A1 | 2/2009 | Rader et al. |
| 2009/0088598 A1 | 4/2009 | Abolfathi |
| 2009/0097684 A1 | 4/2009 | Abolfathi et al. |
| 2009/0097685 A1 | 4/2009 | Menzel et al. |
| 2009/0099408 A1 | 4/2009 | Abolfathi et al. |
| 2009/0105523 A1 | 4/2009 | Kassayan et al. |
| 2009/0147976 A1 | 6/2009 | Abolfathi |

(56) References Cited

U.S. PATENT DOCUMENTS

| | | |
|---|---|---|
| 2009/0149722 A1 | 6/2009 | Abolfathi et al. |
| 2009/0180652 A1 | 7/2009 | Davis et al. |
| 2009/0208031 A1 | 8/2009 | Abolfathi |

FOREIGN PATENT DOCUMENTS

| | | |
|---|---|---|
| EP | 1783919 A1 | 5/2007 |
| JP | 07-210176 | 8/1995 |
| JP | 10-126893 | 5/1998 |
| JP | 2004-167120 | 6/2004 |
| JP | 2006-181257 | 7/2006 |
| JP | 2007028248 A2 | 2/2007 |
| JP | 2007028610 A2 | 2/2007 |
| JP | 2007044284 A2 | 2/2007 |
| JP | 2007049599 A2 | 2/2007 |
| JP | 2007049658 A2 | 2/2007 |
| JP | 2007-079386 | 3/2007 |
| WO | WO 83/02047 | 6/1983 |
| WO | WO 91/02678 | 3/1991 |
| WO | WO 95/19678 | 7/1995 |
| WO | WO 96/21335 | 7/1996 |
| WO | WO 02/09622 | 2/2002 |
| WO | WO 2004/045242 | 5/2004 |
| WO | WO 2004/105650 | 12/2004 |
| WO | WO 2005/000391 | 1/2005 |
| WO | WO 2005/037153 | 4/2005 |
| WO | WO 2005/053533 | 6/2005 |
| WO | WO 2006/088410 | 8/2006 |
| WO | WO 2006/130909 | 12/2006 |
| WO | WO 2007/043055 | 4/2007 |
| WO | WO 2007/052251 | 5/2007 |
| WO | WO 2007/059185 | 5/2007 |
| WO | WO 2007/140367 | 12/2007 |
| WO | WO 2007/140368 | 12/2007 |
| WO | WO 2007/140373 | 12/2007 |
| WO | WO 2007/143453 | 12/2007 |
| WO | WO 2008/024794 | 2/2008 |
| WO | WO 2008/030725 | 3/2008 |
| WO | WO 2009/014812 | 1/2009 |
| WO | WO 2009/025917 | 2/2009 |
| WO | WO 2009/066296 | 5/2009 |
| WO | WO 2009/102889 | 8/2009 |

OTHER PUBLICATIONS

Altmann, et al. Foresighting the new technology waves—Exper Group. In: State of the Art Reviews and Related Papers—Center on Nanotechnology and Society. 2004 Conference. Published Jun. 14, 2004. p. 1-291. Available at http://www.nano-and-society.org/NELSI/documents/ECreviewsandpapers061404.pdf. Accessed Jan. 11, 2009.

Berard, G., "Hearing Equals Behavior" [summary], 1993, http://www.bixby.org/faq/tinnitus/treatment.html.

Broyhill, D., "Battlefield Medical Information System—Telemedicine," A research paper presented to the U.S. Army Command and General Staff College in partial Fulfillment of the requirement for A462 Combat Health Support Seminar, 12 pages, 2003.

Dental Cements—Premarket Notification, U.S. Department of Health and Human Services Food and Drug Administration Center for Devices and Radiological Health, pp. 1-10, Aug. 18, 1998.

Henry, et al. "Comparison of Custom Sounds for Achieving Tinnitus Relief," *J Am Acad Audiol*, 15:585-598, 2004.

Jastreboff, Pawel, J., "Phantom auditory perception (tinnitus): mechanisms of generation and perception," *Neuroscience Research*, 221-254, 1990, Elsevier Scientific Publishers Ireland, Ltd.

Robb, "Tinnitus Device Directory Part I," *Tinnitus Today*, p. 22, Jun. 2003.

Song, S. et al., "A 0.2-mW 2Mb/s Digital Transceiver Bason on Wideband Signaling for Human Body Communications," *IEEE J Solid-State Cir*, 42(9), 2021-2033, Sep. 2007.

Stuart, A., et al., "Investigations of the Impact of Altered Auditory Feedback In-The-Ear Devices on the Speech of People Who Stutter: Initial Fitting and 4-Month Follow-Up," *Int J Lang Commun Disord*, 39(1), Jan. 2004, [abstract only].

Wen, Y. et al, "Online Prediction of Battery Lifetime for Embedded and Mobile Devices," Special Issue on Embedded Systems: Springer-Verlag Heidelberg Lecture Notes in Computer Science, V3164/2004, 15 pages, Dec. 2004.

\* cited by examiner

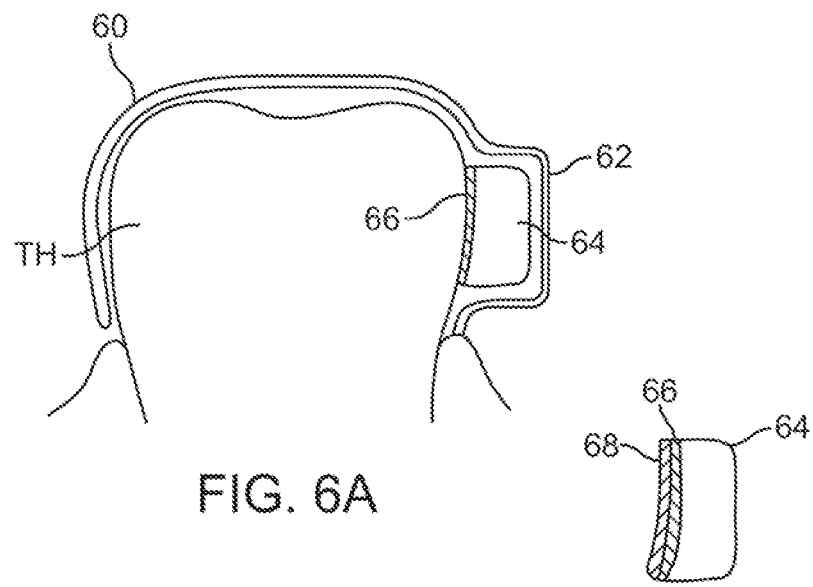
FIG. 6A
FIG. 6B
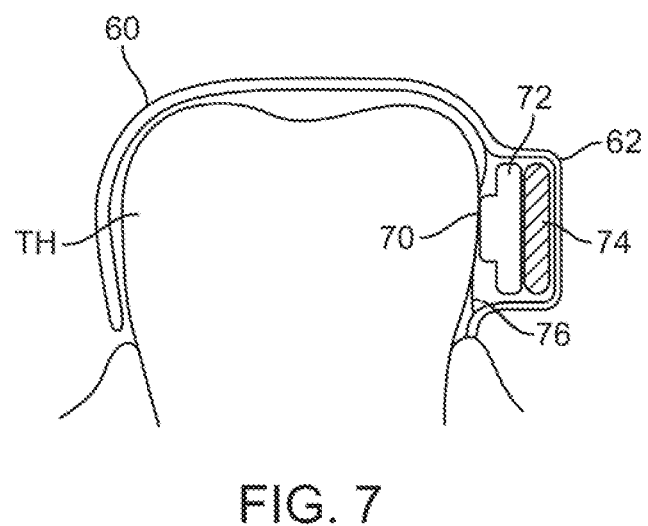
FIG. 7

HEADSET SYSTEMS AND METHODS

CROSS-REFERENCE TO RELATED APPLICATIONS

This application is a continuation of U.S. patent application Ser. No. 12/032,226 filed Feb. 15, 2008, the content of which is incorporated herein by reference in its entirety.

BACKGROUND

The advent of music players and cell phones has driven the demand for small and portable headphones that can reproduce sound with high fidelity so that the user can listen to the sound without disturbing people who are nearby. These headphones typically use small speakers that can render the sound. With cell phones, there is a need to capture the user's voice with a microphone and relay the voice over the cellular network so that the parties can engage in a conversation even though they are separated by great distances. Microphones are transducers just like speakers. They change sound waves into electrical signals, while speakers change electrical signals into sound waves. When a headphone is equipped with a small microphone, it is called a headset.

A headset may be used in conjunction with a telephone device for several reasons. With a headset, the user is relived of the need to hold the phone and thus retains his or her hands free to perform other functions. Headsets also function to position the earphone and microphone portions of a telephone close to the user's head to provide for clearer reception and transmission of audio signals with less interference from background noise. Headsets may be used with telephones, computers, cellular telephones, and other devices.

The wireless industry has launched several after-market products to free the user form holding the phone while making phone calls. For example, various headsets are manufactured with an earpiece connected to a microphone and most of these headsets or hands-free kits are compatible with any phone brand or model. A possible headset can be plugged-in to the phone and comprise a microphone connected via wires to the headset so that the microphone, when in position, can appropriately capture the voice of the user. Other headsets are built in with a Bluetooth chip, or other wireless means, so that the voice conversation can be wirelessly diverted from the phone to the earpiece of the headset. The Bluetooth radio chip acts as a connector between the headset and a Bluetooth chip of the cell-phone.

The ability to correctly identify voiced and unvoiced speech is critical to many speech applications including speech recognition, speaker verification, noise suppression, and many others. In a typical acoustic application, speech from a human speaker is captured and transmitted to a receiver in a different location. In the speaker's environment there may exist one or more noise sources that pollute the speech signal, or the signal of interest, with unwanted acoustic noise. This makes it difficult or impossible for the receiver, whether human or machine, to understand the user's speech.

United States Patent 20080019557 describes a headset which includes a metal or metallic housing to which various accessory components can be attached. These components can include an ear loop, a necklace for the holding of the headset while not being worn on the ear, an external mount, and other components. The components include a magnet which facilitates mounting to the headset. The components are not restricted to a particular attach point, which enhances the ability of the user to adjust the geometry for better fit.

With conventional headsets, people nearby can notice when the user is wearing the headset. U.S. Pat. No. 7,076,077 discloses a bone conduction headset which is inconspicuous in appearance during wearing. The bone conduction headset includes a band running around a back part of the user's head; a fastening portion formed in each of opposite end portions of the band; a bone conduction speaker provided with a knob which is engaged with the fastening portion; and, an ear engagement portion, which runs over the bone conduction speaker during wearing of the headset to reach and engage with the user's ear. An extension of either the fastening portion in the band or a casing of the bone conduction speaker may be formed into the ear engagement portion.

U.S. Pat. No. 7,246,058 discloses a system for detecting voiced and unvoiced speech in acoustic signals having varying levels of background noise. The systems receive acoustic signals at two microphones, and generate difference parameters between the acoustic signals received at each of the two microphones. The difference parameters are representative of the relative difference in signal gain between portions of the received acoustic signals. The systems identify information of the acoustic signals as unvoiced speech when the difference parameters exceed a first threshold, and identify information of the acoustic signals as voiced speech when the difference parameters exceed a second threshold. Further, embodiments of the systems include non-acoustic sensors that receive physiological information to aid in identifying voiced speech.

SUMMARY

In one aspect, a wireless headset adapted to communicate with a sound source includes a mouth wearable communicator; and a linking unit coupled to the mouth wearable communicator, the linking unit adapted to communicate with the sound source.

Implementations of the above aspect may include one or more of the following. The mouth wearable communicator can be a bone conduction device. The mouth wearable communicator can be a custom oral device. The mouth wearable communicator can have a microphone embedded therein. The microphone can be an intraoral microphone or an extraoral microphone. For cellular telephones and other telephones, the microphone can cancel environmental noise and transmit a user's voice to the telephone. The sound source can be a music player, a video player, a cellular telephone, or a computer. The mouth wearable communicator can include a data storage device with its content encrypted. The device can include a housing having a shape which is conformable to at least a portion of at least one tooth; an actuatable transducer disposed within or upon the housing and in vibratory communication with a surface of the at least one tooth; and a wireless communication transceiver coupled to the transducer to provide received sound to the user and to provide communication for the user. The headset can be an oral appliance having a shape which conforms to the at least one tooth. The communicator can include an electronic assembly disposed within or upon the housing and in communication with a transducer. The linking unit can be a transceiver compatible with an 802 protocol, cellular protocol, or Bluetooth protocol. In other embodiments, the device provides an electronic and transducer device that can be attached, adhered, or otherwise embedded into or upon a removable oral appliance or other oral device to form a medical tag containing patient identifiable information. Such an oral appliance may be a custom-made device fabricated front a thermal forming process utilizing a replicate model of a dental structure obtained by conventional dental impression and/or imaging methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

In another aspect, a method for communicating with a portable appliance includes intraorally wearing a mouth wearable communicator; and linking to the mouth wearable communicator to the portable appliance.

Implementations of the above aspect may include one or more of the following. The process includes transmitting sound using a bone conduction device. The mouth wearable communicator can be supplied as a custom oral device. A directional microphone can be used with the mouth wearable communicator. The microphone can be a noise cancelling microphone. The portable appliance can receive short-range transmission from the mouth wearable communicator and relay the transmission over a wide area network. The sound can be communicated through a tooth, a maxillary bone, a mandibular bone, or a palatine bone.

In another aspect, an electronic and transducer device can be attached, adhered, or otherwise embedded into or upon a removable oral appliance or other oral device to form a head-set assembly. In another embodiment, the device provides an electronic and transducer device that can be attached, adhered, or otherwise embedded into or upon a removable oral appliance or other oral device to form a head-set. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

Advantages of preferred embodiments may include one or more of the following. The bone conduction headset is easy to wear and take off in use, and is further inconspicuous in appearance during the user's wearing thereof. The device can be operated without nearby people noticing the user's wearing of the headset. Comparing with headphones, the device avoids covering the ears of the listener. This is important if (a) the listener needs to have the ears unobstructed (to allow them to hear other sounds in the environment), or (b) to allow them to plug the ears (to prevent hearing damage from loud sounds in the environment). The system is a multi-purpose communication platform that is rugged, wireless and secure. The system provides quality, hands-free, yet inconspicuous communication capability for field personnel.

BRIEF DESCRIPTION OF THE DRAWINGS

FIG. 6A shows a partial cross-sectional view of an oral appliance placed upon a tooth with an electronics/transducer assembly adhered to the tooth surface via an adhesive.

FIG. 6B shows a partial cross-sectional view of a removable backing adhered onto an adhesive surface.

FIG. 7 shows a partial cross-sectional view of another variation of an oral appliance placed upon a tooth with an electronics/transducer assembly pressed against the tooth surface via an osmotic pouch.

DESCRIPTION

Figure 1A:
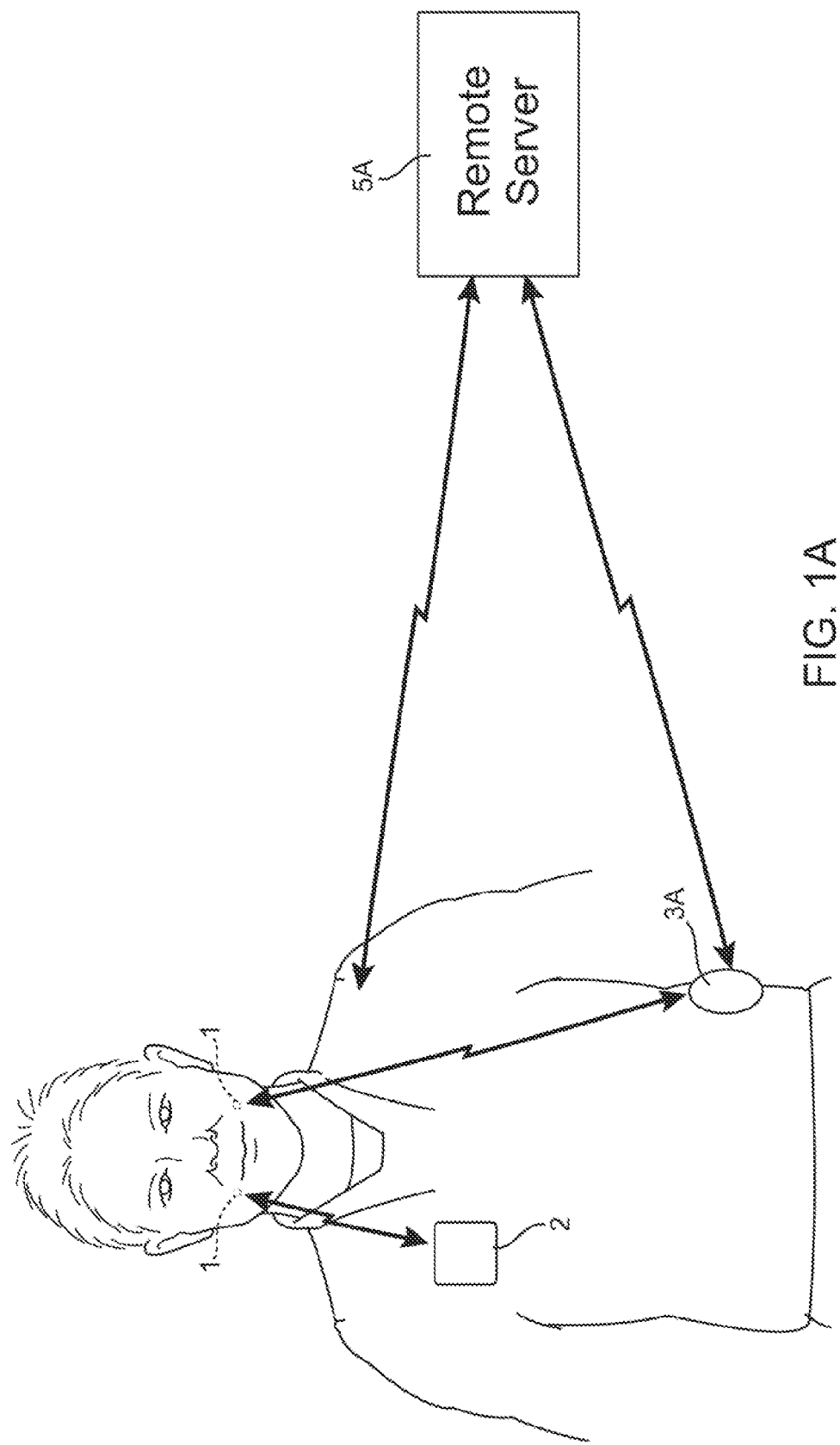
FIG. 1A shows an exemplary bone conduction head-set device.
Figure 1B:
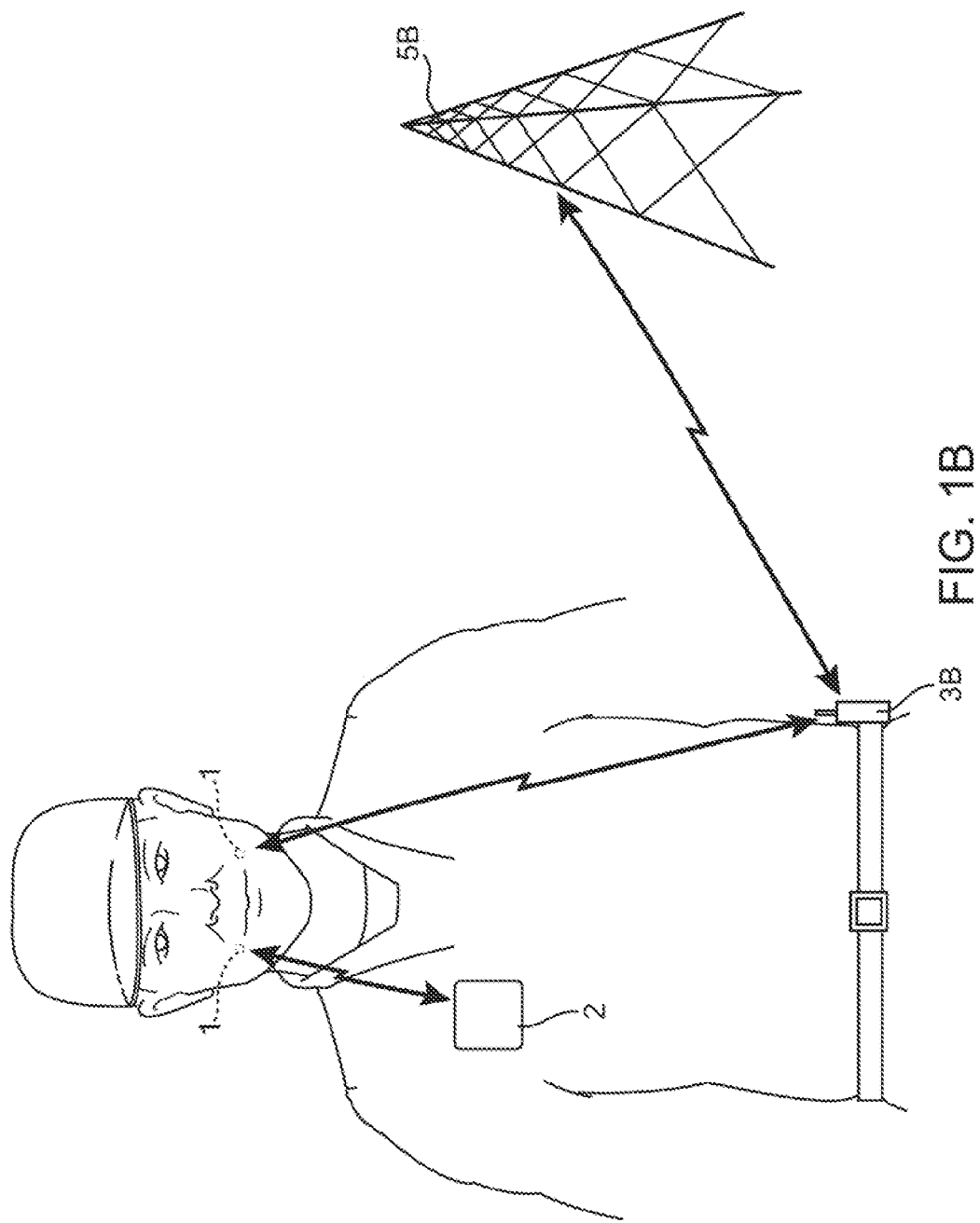
FIG. 1B illustrates the dentition of a patient's teeth and one variation of a two-way communication device which is removably placed upon or against the patient's tooth or teeth as a removable oral appliance.
Figure 1C:
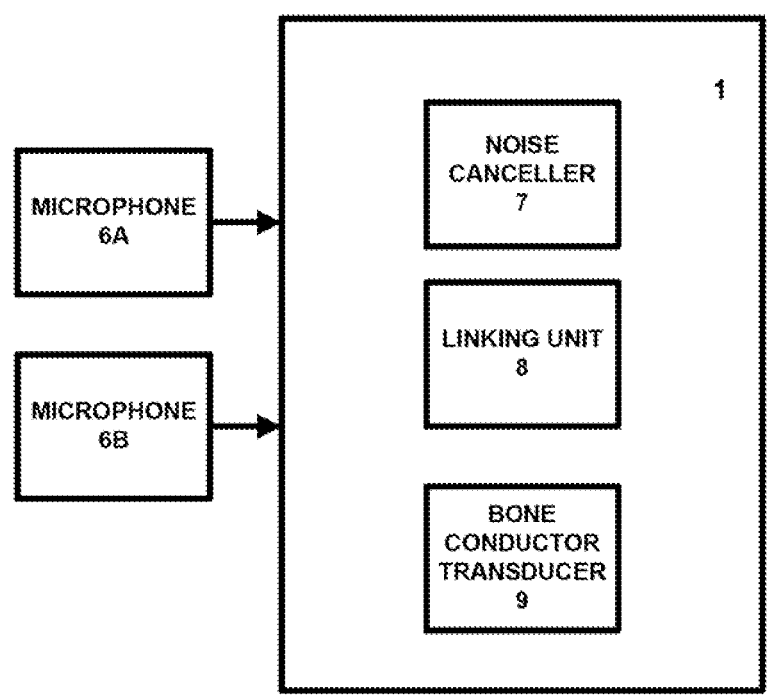
FIG. 1C shows an exemplary head-set circuit.

An exemplary wireless headset communication system is shown in FIG. 1C. Referring now to FIGS. 1A-1D, the headset communication system includes a mouth wearable communicator 1 with a linking unit 8 such as a Bluetooth transceiver that allows the communicator 1 to play sound generated by a portable appliance or a sound source shown in FIG. 1A-1B such as a music player 2, a hands-free communication device 3A or a cellular telephone 3B, for example. Alternatively, the sound source can be a computer, a one-way communication device, a two-way communication device, or a wireless hands-free communication device.

The mouth wearable communicator 1 can be a custom oral device. The sound source unit 2 or 3A or 3B contains a short-range transceiver that is protocol compatible with the linking unit. For example, the sound source can have a Bluetooth transceiver that communicates with the Bluetooth transceiver linking unit 8 in the mouth wearable communicator 1. The mouth wearable communicator 1 can receive the data transmitted over the Bluetooth protocol and drive a bone conduction transducer 9 to render or transmit sound to the user.

The mouth wearable communicator can have a microphone 6A embedded therein. The microphone 6A can be an intraoral microphone or an extraoral microphone. For cellular telephones and other telephones, a second microphone 6B can be used to cancel environmental noise and transmit a user's voice to the telephone. A noise canceller 7 receives signals from the microphones 6A-6B and cancels ambient noise to provide a clean sound capture.

The two way communication device can have a microphone 6B to pick up ambient sound. The microphone 6B can be an intraoral microphone or an extraoral microphone. In one embodiment, the microphone cancels environmental noise and transmits a user's voice to the remote station. This embodiment provides the ability to cancel environmental noises while transmitting subject's own voice to the phone 3B which in turn communicates with a remote base station 5B. As the microphone is in a fixed location (compared to ordinary wireless communication devices) and very close to user's own voice, the system can handle environmental noise reduction that is important in working in high noise areas. As such, the headset of FIG. 1A or 1B can be used by workers in loud environments such as a professional entertainer or athlete and/or support personnel, a soldier, a medic, a fireman, an emergency worker, among others.

The mouth wearable communicator 1 can use a bone conduction transducer 9 or any suitable bone conduction device. The mouth wearable communicator 1 can be a custom oral device. The mouth wearable communicator 1 can include a data storage device with its content encrypted. The device can include a housing having a shape which is conformable to at least a portion of at least one tooth; an actuatable transducer disposed within or upon the housing and in vibratory communication with a surface of the at least one tooth; and a wireless communication transceiver coupled to the transducer to provide received sound to the user and to provide communication for the user. The headset can be an oral appliance having a shape which conforms to the at least one tooth. The communicator can include an electronic assembly disposed within or upon the housing and in communication with a transducer. The linking unit 8 can be a transceiver compatible with an 802 protocol, cellular protocol, or Bluetooth protocol. In other embodiments, the device provides an electronic and transducer device that can be attached, adhered, or otherwise embedded into or upon a removable oral appliance or other oral device to form a medical tag containing patient identifiable information. Such an oral appliance may be a custom-made device fabricated from a thermal forming process utilizing a replicate model of a dental structure obtained by conventional dental impression and/or imaging methods. The electronic and transducer assembly may receive incoming, sounds either directly or through a receiver to process and amplify the signals and transmit the processed sounds via a vibrating transducer element coupled to a tooth or other bone structure, such as the maxillary, mandibular, or palatine bone structure.

The system couples microphones and voicing activity sensors to a signal processor. The processor executes a detection algorithm, and a denoising code to minimize background acoustic noise.

Two microphones 6A-6B are used, with the microphone 6A being the bone conduction microphone and which is considered the "signal" microphone. The microphone 6B captures air noise or ambient noise, whose signal is filtered and subtracted from the signal in the microphone 6A.

In one embodiment, the system runs an array algorithm for speech detection that uses the difference in frequency content between two microphones to calculate a relationship between the signals of the two microphones. As known in the art and discussed in U.S. Pat. No. 7,246,058, the content of which is incorporated by reference, this embodiment can cancel noise without requiring a specific orientation of the array with respect to the signal.

In the embodiment of FIG. 1A, the linking unit in the communicator 1 can communicate through Bluetooth with a one way or two way communication device 3A. The device can be a music player or a hands-free voice communication system such as a walkie-talkie. In another embodiment, the one-way or two-way communication device can be WiFi VOIP system that allows the user to communicate with others over a wireless local area network through a wireless LAN based server 5A. For example, the Vocera Communications System can be used as a wireless platform that provides hands-free, voice communication throughout an 802.11b/g networked building or campus. The system enables fluid, instant voice conversations among team members, across groups, and throughout an organization of mobile professionals. The Vocera Communications System consists of two key components: the Vocera System Software that controls and manages call activity, and the Vocera Communications Badge-B2000 a lightweight, voice-controlled communication device that allows users to converse over a wireless LAN (802.11b/g). Together, the Vocera System Software and Badge, allow users to instantly communicate with others throughout a building or campus environment. By using the bone conduction headset 1 with a hands-free voice system such as the Vocera system, the user can communicate sensitive patient information in confidence and thus allows the user to meet the strict requirement of patient privacy regulations such as HIPPA, for example.

In the embodiment of FIG. 1B, the sound source can be a cellular telephone 3 that communicates with a cellular base station 5B. Alternatively, the station 5B can be a satellite, a cellular tower, a relay station mounted on an airplane or a helicopter, or a relay station mounted on a blimp, among others. Sound received by the cellular telephone 3B is sent via Bluetooth to the linking unit in the communicator 1.

In one embodiment, the mouth wearable communicator has a housing having, a shape which is conformable to at least a portion of at least one tooth; an actuatable transducer disposed within or upon the housing and in vibratory communication with a surface of the at least one tooth; and a wireless communication transceiver coupled to the transducer to provide received sound to the user and to provide communication for the user. The two way communication device can be an oral appliance having a shape which conforms to the at least one tooth. An electronic assembly can be disposed within or upon the housing and which is in communication with the transducer.

In another embodiment, the device 1 provides an electronic and transducer device 9 that can be attached, adhered, or otherwise embedded into or upon a removable oral appliance or other oral device to form a medical tag containing patient identifiable information. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

In one embodiment, the microphones can be place on each side of the ears to provide noise cancellation, optimal sound localization and directionality. The microphones can be placed inside or outside the ears. For example, the microphones can be placed either at the opening or directly with the user's ear canals. Each of the systems includes a battery, a signal processor, a transmitter, all of which can be positioned in a housing that clips onto the ear which, rests behind the ear between the pinna and the skull, or alternatively can be positioned in the ear's concha. The transmitter is connected to a wire/antenna that in turn is connected to the microphone.

Each transmitter transmits information to a receiver that activates a transducer that is powered by a battery. Each side of the head can have one set of receiver, transducer and battery. This embodiment provides a bone conduction hearing aid device with dual externally located microphones that are placed at the entrance to or in the ear canals and an oral appliance containing dual transducers in communication with each other. The device will allow the user to enjoy the most natural sound input due to the location of the microphone which takes advantage of the pinna for optimal sound localization (and directionality).

In another embodiment, the microphones receive sound signals from both sides of the head, processes those signals to send a signal to the transducer on the side of the head where the sound is perceived by the microphone to be at a higher sound level. A phase-shifted signal is sent to the transducer on the opposite side of the head. These sounds will then "add" in the cochlea where the sound is louder and "cancel" on the opposite cochlea providing the user with the perception of directionality of the sound.

In yet another embodiment, the microphone at the first ear receives sound signals from the first side of the head, processes those signal to send a signal to the transducer on that same or first side of the oral appliance. A second microphone at the second ear receives a sound signal that is lower in amplitude and delayed in respect to the sound sensed by the first microphone due to head shadowing and physical separation of the microphones, and sends a corresponding signal to the second transducer on the second side of the oral appliance. The sound signals from the transducers will be perceived by each cochlea on each side of the head as being different in amplitude and phase, which will result in the perception of directionality by the user.

Figure 2A:
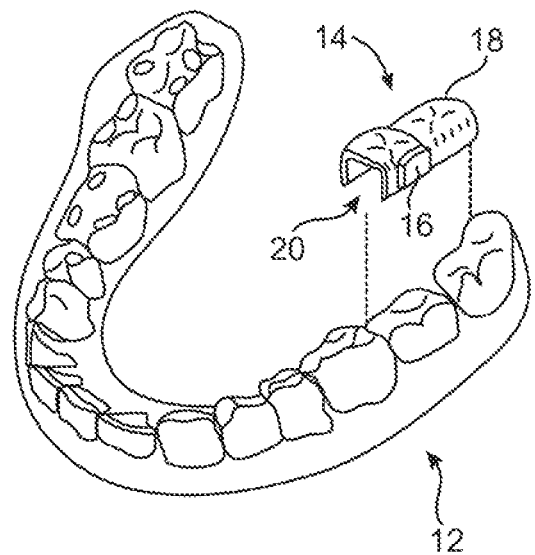
FIG. 2A illustrates a perspective view of the lower teeth showing one exemplary location for placement of the removable oral appliance two-way communication device.
Figure 3:
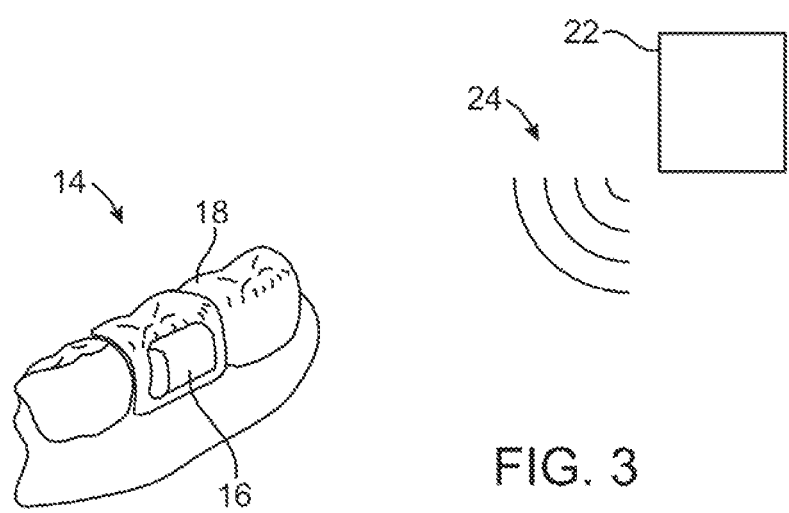
FIG. 3 illustrates a detail perspective view of the oral appliance positioned upon the patient's teeth utilizable in combination with a transmitting assembly external to the mouth and wearable by the patient in another variation of the device.

FIG. 2-3 show in more detail one exemplary mounting of hearing system 1 with the microphone 7 in the user's ear canal. As shown therein, the components such as the battery 3, the signal processor 4, and the transmitter 5 can either be located behind the ear or within the folds of the pinna. The human auricle is an almost rudimentary, usually immobile shell that lies close to the side of the head with a thin plate of yellow fibrocartilage covered by closely adherent skin. The cartilage is molded into clearly defined hollows, ridges, and furrows that form an irregular, shallow funnel. The deepest depression, which leads directly to the external auditory canal, or acoustic meatus, is called the concha. It is partly covered by two small projections, the tonguelike tragus in front and the antitragus behind. Above the tragus a prominent ridge, the helix, arises from the floor of the concha and continues as the incurved rim of the upper portion of the auricle. An inner, concentric ridge, the antihelix, surrounds the concha and is separated from the helix by a furrow, the scapha, also called the fossa of the helix. The lobule, the fleshy lower part of the auricle, is the only area of the outer ear that contains no cartilage. The auricle also has several small rudimentary muscles, which fasten it to the skull and scalp. In most individuals these muscles do not function, although some persons can voluntarily activate them to produce limited movements. The external auditory canal is a slightly curved tube that extends inward from the floor of the concha and ends blindly at the tympanic membrane. In its outer third the wall of the canal consists of cartilage; in its inner two-thirds, of bone. The anthelix (antihelix) is a folded "Y" shaped part of the ear. The antitragus is the lower cartilaginous edge of the conchal bowl just above the fleshy lobule of the ear.

As best shown in FIG. 3, the microphone 7 is positioned in the ear canal. The microphone 7 is connected with the transmitter 5 through the wire and antenna 6. The placement of the microphone 7 inside the ear canal provides the user with the most natural sound input due to the location of the microphone which takes advantage of the pinna for optimal sound localization (and directionality) when the sounds are transmitted to the cochlea using a straight signal and "phase-shifted" signal to apply directionality to the patient. High quality sound input is captured by placing the microphones within or at the entrance of the ear canal which would allow the patient to use the sound reflectivity of the pinna as well as improved sound directionality due to the microphone placement. The arrangement avoids the need to separate the microphone and speaker to reduce the chance of feedback and allows placement of the microphone to take advantage of the sound reflectivity of the pinna. The system also allows for better sound directionality due to the two bone conduction transducers being in electrical contact with each other. With the processing of the signals prior to being sent to the transducers and the transducers able to communicate with each other, the system provides the best sound localization possible.

The mouth wearable communicator can provide a data storage device such as a solid state memory or a flash storage device. The content of the data storage device can be encrypted for security. The linking unit can transmit encrypted data for secure transmission if desired.

Figure 1D:
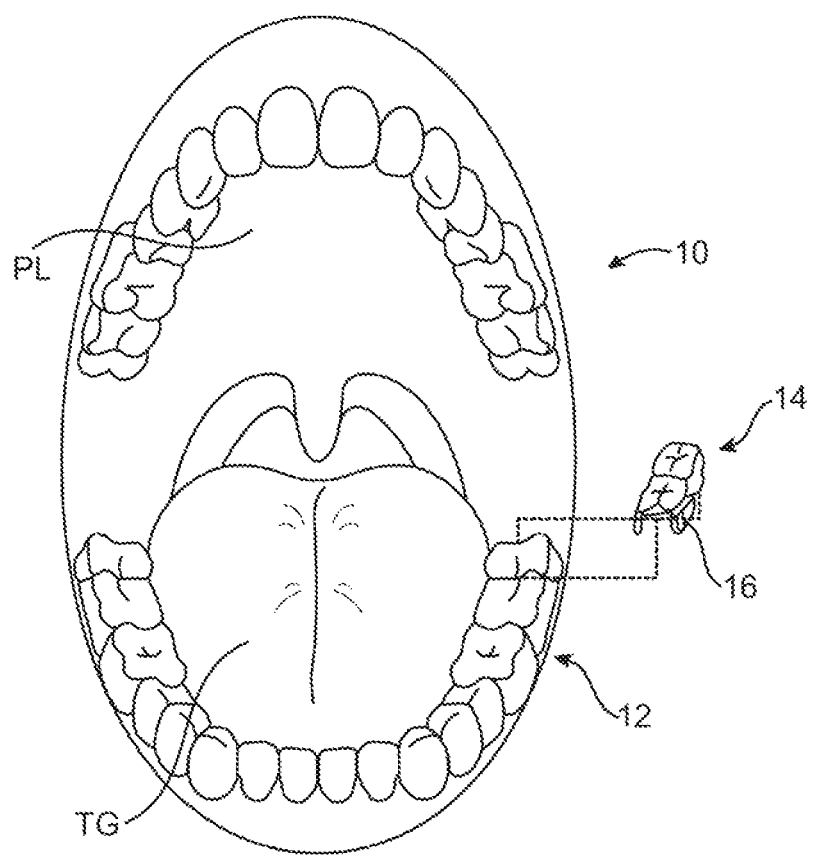
FIG. 1D shows an exemplary intra-oral housing for the head-set circuit of FIG. 1C.

Turning now to more details on the device 1, as shown in FIG. 1D, a patient's mouth and dentition 10 is illustrated showing one possible location for removably attaching two-way communication assembly 14 upon or against at least one tooth, such as a molar 12. The patient's tongue TG and palate PL are also illustrated for reference. An electronics and/or transducer assembly 16 may be attached, adhered, or otherwise embedded into or upon the assembly 14, as described below in further detail.

FIG. 2A shows a perspective view of the patient's lower dentition illustrating the two-way communication assembly 14 comprising a removable oral appliance 18 and the electronics and/or transducer assembly 16 positioned along a side surface of the assembly 14. In this variation, oral appliance 18 may be fitted upon two molars 12 within tooth engaging channel 20 defined by oral appliance 18 for stability upon the patient's teeth, although in other variations, a single molar or tooth may be utilized. Alternatively, more than two molars may be utilized for the oral appliance 18 to be attached upon or over. Moreover, electronics and/or transducer assembly 16 is shown positioned upon a side surface of oral appliance 18 such that the assembly 16 is aligned along a buccal surface of the tooth 12; however, other surfaces such as the lingual surface of the tooth 12 and other positions may also be utilized. The figures are illustrative of variations and are not intended to be limiting; accordingly, other configurations and shapes for oral appliance 18 are intended to be included herein.

Figure 2B:
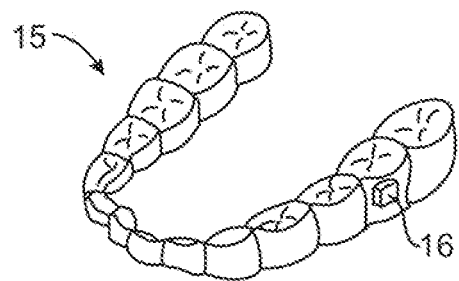
FIG. 2B illustrates another variation of the removable oral appliance in the form of an appliance which is placed over an entire row of teeth in the manner of a mouthguard.

FIG. 2B shows another variation of a removable oral appliance in the form of an appliance 15 which is placed over an entire row of teeth in the manner of a mouthguard. In this variation, appliance 15 may be configured to cover an entire bottom row of teeth or alternatively an entire upper row of teeth. In additional variations, rather than covering the entire rows of teeth, a majority of the row of teeth may be instead be covered by appliance 15. Assembly 16 may be positioned along one or more portions of the oral appliance 15.

Figure 2C:
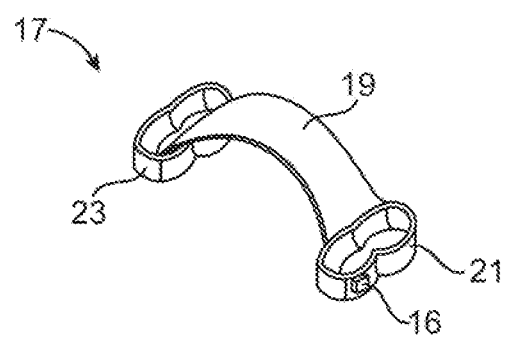
FIG. 2C illustrates another variation of the removable oral appliance which is supported by an arch.
Figure 2D:
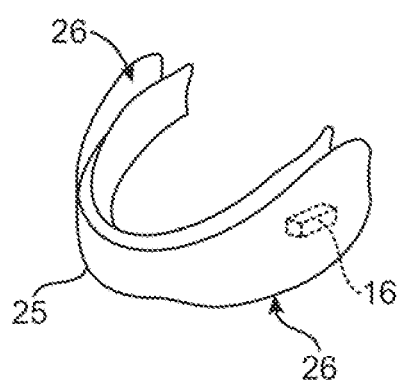
FIG. 2D illustrates another variation of an oral appliance configured as a mouthguard.

FIG. 2C shows yet another variation of an oral appliance 17 having an arched configuration. In this appliance, one or more tooth retaining portions 21, 23, which in this variation may be placed along the upper row of teeth, may be supported by an arch 19 which may lie adjacent or along the palate of the user. As shown, electronics and/or transducer assembly 16 may be positioned along one or more portions of the tooth retaining portions 21, 23. Moreover, although the variation shown illustrates an arch 19 which may cover only a portion of the palate of the user, other variations may be configured to have an arch which covers the entire palate of the user.

Figure 20:
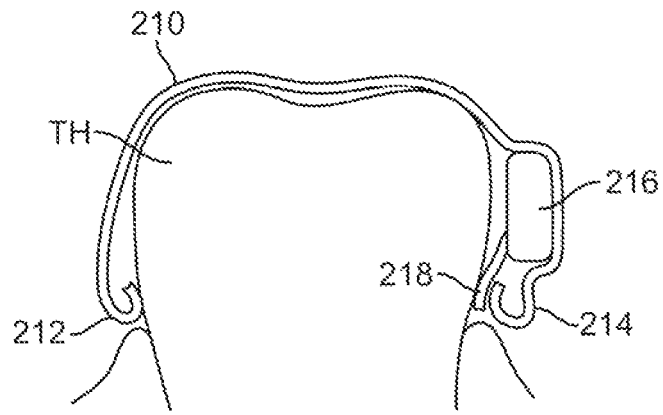
FIG. 20 illustrates yet another variation of an oral appliance made from a pre-formed material in which the transducer may be positioned between the biased side of the oral appliance and the tooth surface.

FIG. 20 illustrates yet another variation of an oral appliance in the form of a mouthguard or retainer 25 which may be inserted and removed easily from the user's mouth. Such a mouthguard or retainer 25 may be used in sports where conventional mouthguards are worn; however, mouthguard or retainer 25 having assembly 16 integrated therein may be utilized by persons, hearing impaired or otherwise, who may simply hold the mouthguard or retainer 25 via grooves or channels 26 between their teeth for receiving instructions remotely and communicating over a distance.

Generally, the volume of electronics and/or transducer assembly 16 may be minimized so as to lie unobtrusive and as comfortable to the user when placed in the mouth. Although the size may be varied, a volume of assembly 16 may be less than 800 cubic millimeters. This volume is, of course, illustrative and not limiting as size and volume of assembly 16 and may be varied accordingly between different users.

Moreover, removable oral appliance 18 may be fabricated from various polymeric or a combination of polymeric and metallic materials using any number of methods, such as computer-aided machining processes using computer numerical control (CNC) systems or three-dimensional printing processes, e.g., stereolithography apparatus (SLA), selective laser sintering (SLS), and/or other similar processes utilizing three-dimensional geometry of the patient's dentition, which may be obtained via any number of techniques. Such techniques may include use of scanned dentition using intra-oral scanners such as laser, white light, ultrasound, mechanical three-dimensional touch scanners, magnetic resonance imaging (MRI), computed tomography (CT), other optical methods, etc.

In forming the removable oral appliance 18, the appliance 18 may be optionally formed such that it is molded to fit over the dentition and at least a portion of the adjacent gingival tissue to inhibit the entry of food, fluids, and other debris into the oral appliance 18 and between the transducer assembly and tooth surface. Moreover, the greater surface area of the oral appliance 18 may facilitate the placement and configuration of the assembly 16 onto the appliance 18.

Additionally, the removable oral appliance 18 may be optionally fabricated to have a shrinkage factor such that when placed onto the dentition, oral appliance 18 may be configured to securely grab onto the tooth or teeth as the appliance 18 may have a resulting size slightly smaller than the scanned tooth or teeth upon which the appliance 18 was formed. The fitting, may result in a secure interference fit between the appliance 18 and underlying dentition.

In one variation, with assembly 14 positioned upon the teeth, as shown in FIG. 3, an extra-buccal transmitter assembly 22 located outside the patient's mouth may be utilized to receive auditory signals for processing and transmission via a wireless signal 24 to the electronics and/or transducer assembly 16 positioned within the patient's mouth, which may then process and transmit the processed auditory signals via vibratory conductance to the underlying tooth and consequently to the patient's inner ear.

The transmitter assembly 22, as described in further detail below, may contain a microphone assembly as well as a transmitter assembly and may be configured in any number of shapes and forms worn by the user, such as a watch, necklace, lapel, phone, belt-mounted device, etc.

Figure 4:
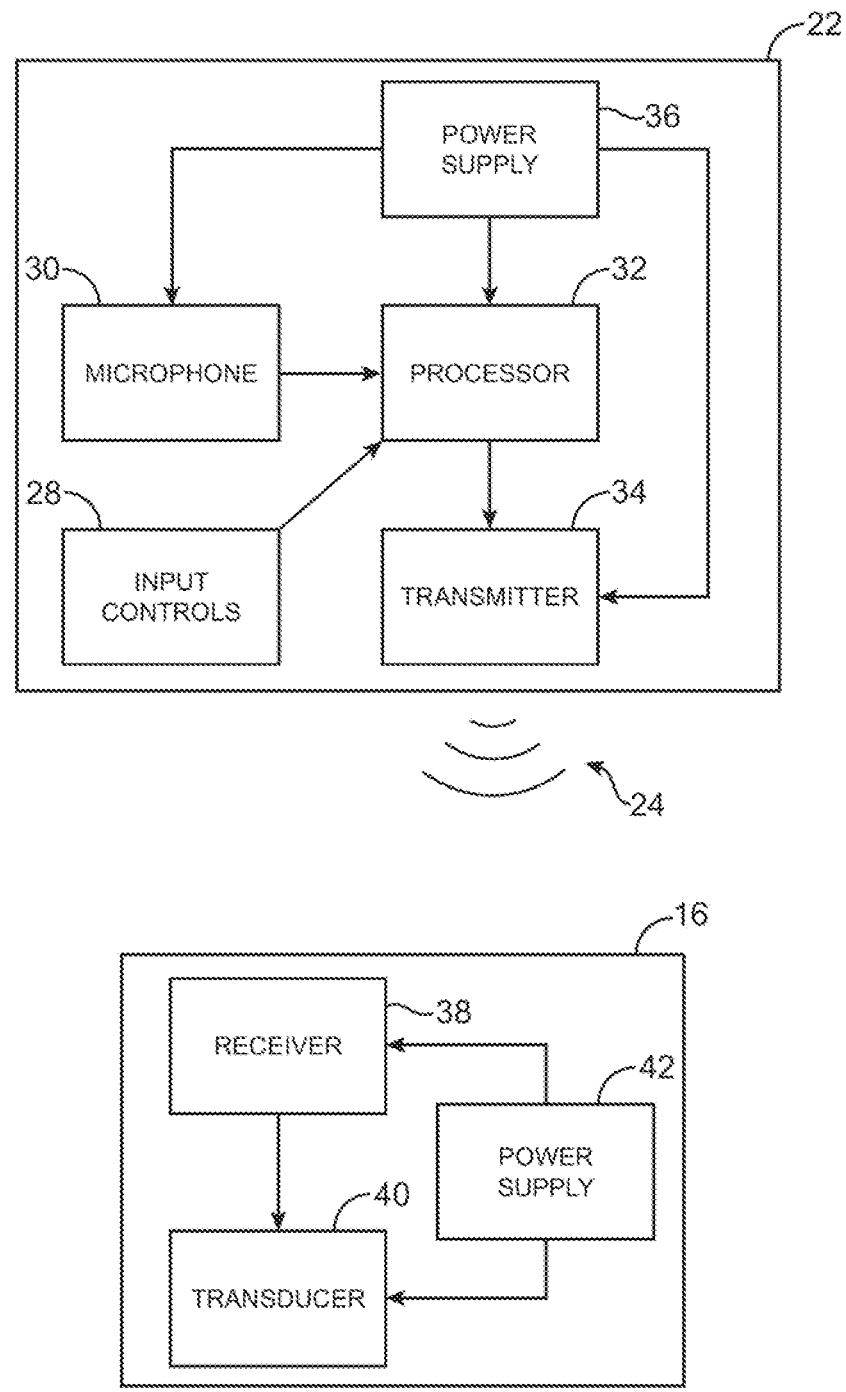
FIG. 4 shows an illustrative configuration of the individual components in a variation of the oral appliance device having an external transmitting assembly with a receiving and transducer assembly within the mouth.

FIG. 4 illustrates a schematic representation of one variation of two-way communication assembly 14 utilizing an extra-buccal transmitter assembly 22, which may generally comprise microphone 30 for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22 may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via receiver 38, which may be connected to an internal processor for additional processing of the received signals. The received signals may be communicated to transducer 40. Which may vibrate correspondingly against a surface of the tooth to conduct the vibratory signals through the tooth and bone and subsequently to the middle ear to facilitate hearing of the user. Transducer 40 may be configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 to 4000 Hz.

Power supply 42 may also be included with assembly 16 to provide power to the receiver, transducer, anchor processor, if also included. Although power supply 42 may be a simple battery, replaceable or permanent, other variations may include a power supply 42 which is charged by inductance via an external charger. Additionally, power supply 42 may alternatively be charged via direct coupling to an alternating current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

Figure 5:
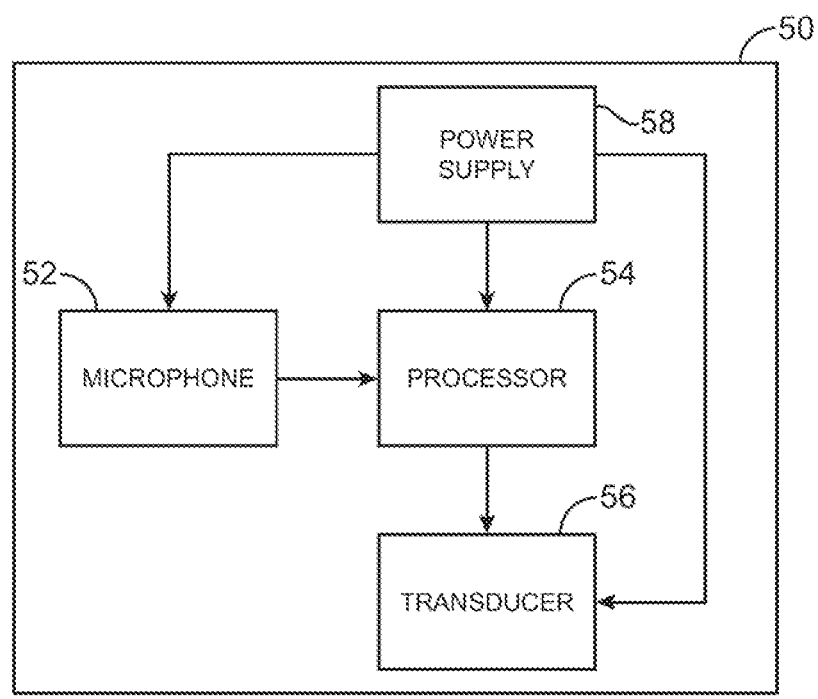
FIG. 5 shows an illustrative configuration of another variation of the device in which the entire assembly is contained by the oral appliance within the user's mouth.

In another variation of assembly 16, rather than utilizing an extra-buccal transmitter, two-way communication assembly 50 may be configured as an independent assembly contained entirely within the user's mouth, as shown in FIG. 5. Accordingly, assembly 50 may include an internal microphone 52 in communication with an on-board processor 54. Internal microphone 52 may comprise any number of different types of microphones, as described above. Processor 54 may be used to process any received auditory signals for filtering and/or amplifying the signals and transmitting them to transducer 56, which is in vibratory contact against the tooth surface. Power supply 58, as described above, may also be included within assembly 50 for providing power to each of the components of assembly 50 as necessary.

In order to transmit the vibrations corresponding to the received auditory signals efficiently and with minimal loss to the tooth or teeth, secure mechanical contact between the transducer and the tooth is ideally maintained to ensure efficient vibratory communication. Accordingly, any number of mechanisms may be utilized to maintain this vibratory communication.

In one variation as shown in FIG. 6A, a partial cross-sectional view of a removable oral appliance 60 is shown placed over or upon a tooth TH. Electronics and/or transducer housing 62 may be seen defined along oral appliance 60 such that housing 62 is aligned or positioned adjacent to a side surface, buccal and/or lingual surface, of the tooth TH. Housing 62 may provide protection to the electronics and/or transducer assembly from the environment of the mouth.

An electronics and/or transducer assembly 64 may be simply placed, embedded, or encapsulated within housing 62 for contacting the tooth surface. In this variation, assembly 64 may be adhered against the tooth surface is an adhesive surface or film 66 such that contact is maintained between the two. As shown in FIG. 6B, a removable backing 68 may be adhered onto adhesive surface 66 and removed prior to placement upon the tooth surface. In this manner, assembly 64 may be replaced upon the tooth as necessary with additional electronics and/or transducer assemblies.

Aside from an adhesive film 66, another alternative may utilize an expandable or swellable member to ensure a secure mechanical contact of the transducer against the tooth. As shown in FIG. 7, an osmotic patch or expandable hydrogel 74 may be placed between housing 62 and electronics and/or transducer assembly 72. After placement of oral appliance 60, hydrogel 74 may absorb some fluids, either from any surrounding fluid or from a fluid introduced, into hydrogel 74, such that hydrogel 74 expands in size to force assembly 72 into contact against the tooth surface. Assembly 72 may be configured to define a contact surface 70 having a relatively smaller contact area to facilitate uniform contact of the surface 70 against the tooth. Such a contact surface 70 may be included in any of the variations described herein. Additionally, a thin encapsulating layer or surface 76 may be placed over housing 62 between contact surface 70 and the underlying tooth to prevent any debris or additional fluids from entering housing 62.

Figure 8:
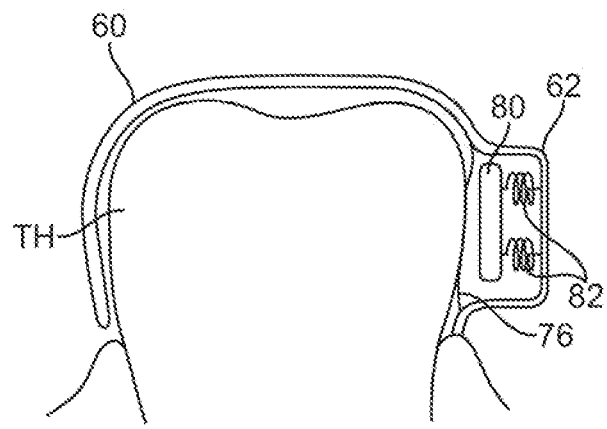
FIG. 8 shows a partial cross-sectional view of another variation elan oral appliance placed upon a tooth with an electronics/transducer assembly pressed against the tooth surface via one or more biasing elements.

Another variation is shown in FIG. 8, which shows electronics and/or transducer assembly 80 contained within housing 62. In this variation, one or more biasing elements 82, e.g., springs, pre-formed shape memory elements, etc., may be placed between assembly 80 and housing 62 to provide a pressing force on assembly 80 to urge the device against the underlying tooth surface, thereby ensuring mechanical contact.

Figure 9:
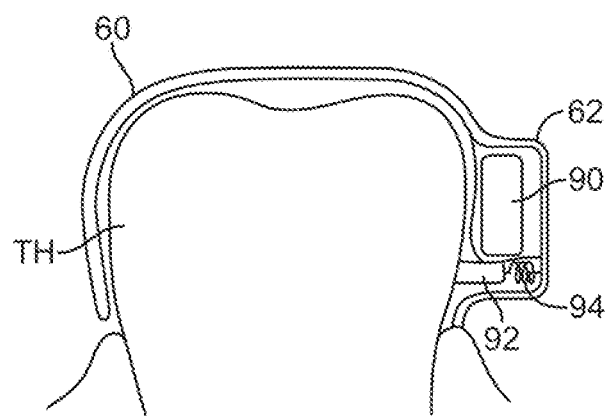
FIG. 9 illustrates another variation of an oral appliance having an electronics assembly and a transducer assembly separated from one another within the electronics and transducer housing of the oral appliance.

In yet another variation, the electronics may be contained as a separate assembly 90 which is encapsulated within housing 62 and the transducer 92 may be maintained separately from assembly 90 but also within housing 62. As shown in FIG. 9, transducer 92 may be urged against the tooth surface via a spring or other biasing element 94 and actuated via any of the mechanisms described above.

Figure 10:
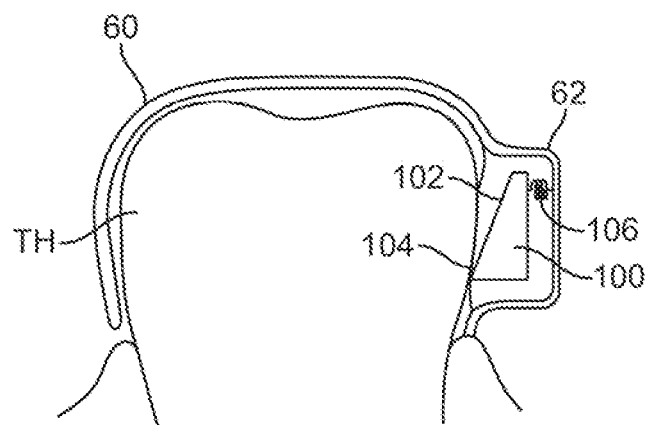
FIGS. 10 and 11 illustrate additional variations of oral appliances in which the electronics and transducer assembly are maintainable against the tooth surface via a ramped surface and a biasing element.

In other variations as shown in FIG. 10, electronics and/or transducer assembly 100 may be configured to have a ramped surface 102 in apposition to the tooth surface. The surface 102 may be angled away from the occlusal surface of the tooth. The assembly 100 may be urged via, a biasing element or spring 106 which forces the ramped surface 102 to pivot about a location 104 into contact against the tooth to ensure contact for the transducer against the tooth surface.

Figure 11:
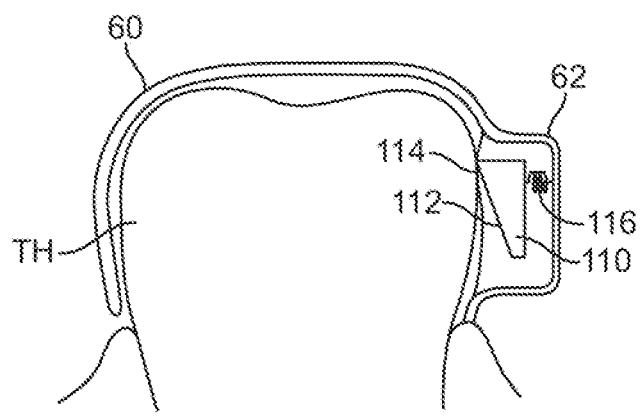

FIG. 11 illustrates another similar variation in electronics and/or transducer assembly 110 also having a ramped surface 112 in apposition to the tooth surface. In this variation, the ramped surface 112 may be angled towards the occlusal surface of the tooth. Likewise, assembly 110 may be urged via a biasing element or spring 116 which urges the assembly 110 to pivot about its lower end such that the assembly 110 contacts the tooth surface at a region 114.

Figure 12:
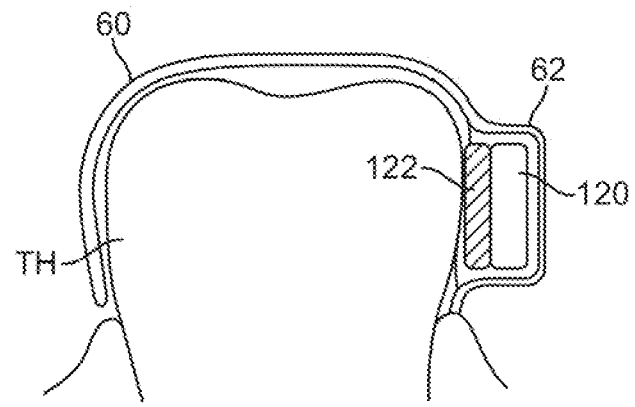
FIG. 12 shows yet another variation of an oral appliance having an interfacing member positioned between the electronics and/or transducer assembly and the tooth surface.

In yet another variation shown in FIG. 12, electronics and/or transducer assembly 120 may be positioned within housing 62 with an interface layer 122 positioned between the assembly 120 and the tooth surface. Interface layer 122 may be configured to conform against the tooth surface and against assembly 120 such that vibrations may be transmitted through layer 122 and to the tooth in a uniform manner. Accordingly, interface layer 122 may be made from a material which attenuates vibrations minimally. Interface layer 122 may be made in a variety of forms, such as a simple insert, an O-ring configuration, etc. or even in a gel or paste form, such as denture or oral paste, etc. Additionally, layer 122 may be fabricated from various materials, e.g., hard plastics or polymeric materials, metals, etc.

Figure 13:
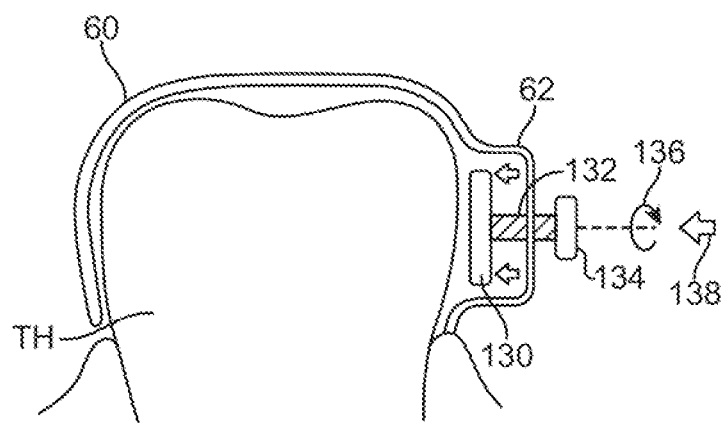
FIG. 13 shows yet another variation of an oral appliance having an actuatable mechanism for urging the electronics and/or transducer assembly against the tooth surface.

FIG. 13 illustrates yet another variation in which electronics and/or transducer assembly 130 may be urged against the tooth surface via a mechanical mechanism. As shown, assembly 130 may be attached to a structural member 132, e.g., a threaded member or a simple shaft, which is connected through housing 62 to an engagement member 134 located outside housing 62. The user may rotate engagement member 134 (as indicated by rotational arrow 136) or simply push upon member 134 (as indicated by linear arrow 138) to urge assembly 130 into contact against the tooth. Moreover, actuation of engagement member 134 may be accomplished manually within the mouth or through the user's cheek or even through manipulation via the user's tongue against engagement member 134.

Figure 14:
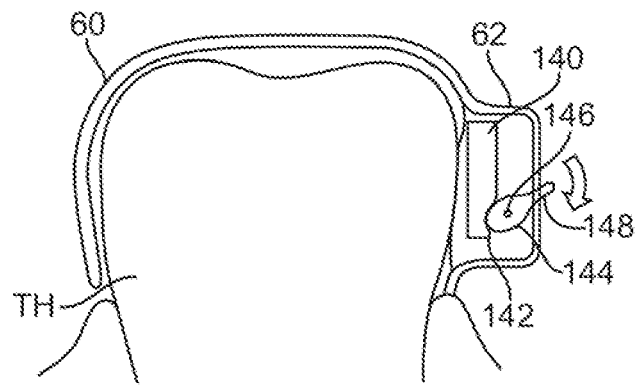
FIG. 14 shows yet another variation of an oral appliance having a cam mechanism for urging the electronics and/or transducer assembly against the tooth surface.

Another variation for a mechanical mechanism is illustrated in FIG. 14. In this variation, electronics and/or transducer assembly 140 may define a portion as an engaging surface 142 for contacting against a cam or lever mechanism 144. Cam or lever mechanism 144 may be configured to pivot 146 such that actuation of a lever 148 extending through housing 62 may urge cam or lever mechanism 144 to push against engaging surface 142 such that assembly 140 is pressed against the underlying tooth surface.

Figure 15:
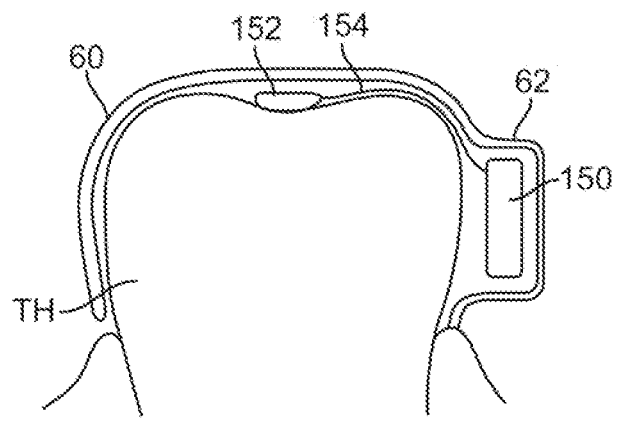
FIG. 15 shows yet another variation of an oral appliance having a separate transducer mechanism positionable upon the occlusal surface of the tooth for transmitting vibrations.

In yet another variation, the electronics 150 and the transducer 152 may be separated from one another such that electronics 150 remain disposed within housing 62 but transducer 152, connected via wire 154, is located beneath dental oral appliance 60 along an occlusal surface of the tooth, as shown in FIG. 15. In such a configuration, vibrations are transmitted via the transducer 152 through the occlusal surface of the tooth. Additionally, the user may bite down upon the oral appliance 60 and transducer 152 to mechanically compress the transducer 152 against the occlusal surface to further enhance the mechanical contact between the transducer 152 and underlying tooth to further facilitate transmission therethrough.

Figure 16:
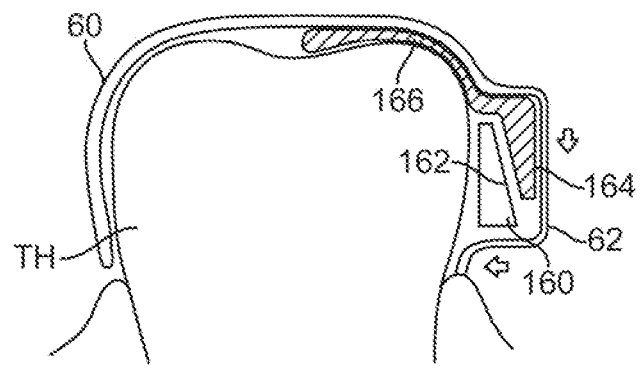
FIG. 16 illustrates another variation of an oral appliance having a mechanism for urging the electronics and/or transducer assembly against the tooth surface utilizing a bite-actuated mechanism.

In the variation of FIG. 16, another example for a bite-enhanced coupling mechanism is illustrated where electronics and/or transducer assembly 160 defines an angled interface surface 162 in apposition to a correspondingly angled engaging member 164. A proximal end of engaging member 164 may extend through housing 62 and terminate in a pusher member 166 positioned over an occlusal surface of the tooth TH. Once oral appliance 60 is initially placed over tooth TH, the user may bite down or otherwise press down upon the top portion of oral appliance 60, thereby pressing down upon pusher member 166 which in turn pushes down upon engaging member 164, as indicated by the arrow. As engaging member 164 is urged downwardly towards the gums, its angled surface may push upon the corresponding and oppositely angled surface 162 to urge assembly 160 against the tooth surface and into a secure mechanical contact.

Figure 17:
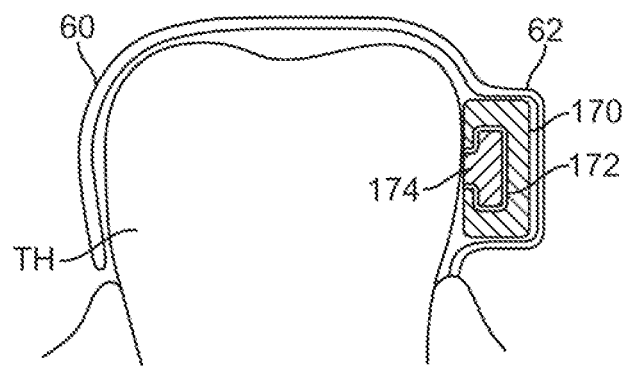
FIG. 17 shows yet another variation of an oral appliance having a composite dental anchor for coupling the transducer to the tooth.

In yet another variation, an electronics and/or transducer assembly 170 may define a channel or groove 172 along a surface for engaging a corresponding dental anchor 174, as shown in FIG. 17. Dental anchor 174 may comprise a light-curable acrylate-based composite material adhered directly to the tooth surface. Moreover dental anchor 174 may be configured in a shape which corresponds to a shape of channel or groove 172 such that the two may be interfitted in a mating engagement. In this manner, the transducer in assembly 170 may vibrate directly against dental anchor 174 which may then transmit these signals directly into the tooth TH.

Figure 18A:
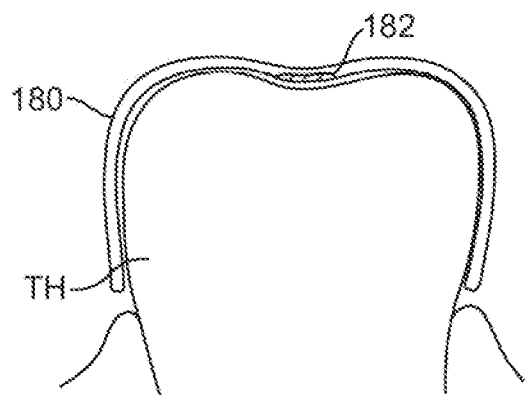
FIGS. 18A and 18B show side and top views, respectively, of an oral appliance variation having one or more transducers which may be positioned over the occlusal surface of the tooth.
Figure 18B:
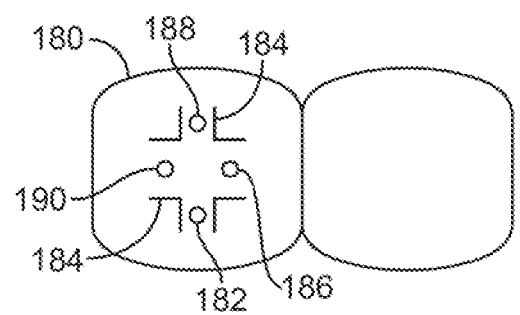

FIGS. 18A and 18B show partial cross-sectional side and top views, respectively, of another variation in which oral appliance 180 may define a number of channels or grooves 184 along a top portion of oral appliance 180. Within these channels or grooves 184, one or more transducers 182, 186, 188, 190 may be disposed such that they are in contact with the occlusal surface of the tooth and each of these transducers may be tuned to transmit frequencies uniformly. Alternatively, each of these transducers may be tuned to transmit only at specified frequency ranges. Accordingly, each transducer can be programmed or preset for a different frequency response such that each transducer may be optimized for a different frequency response and/or transmission to deliver a relatively high-fidelity sound to the user.

Figure 19A:
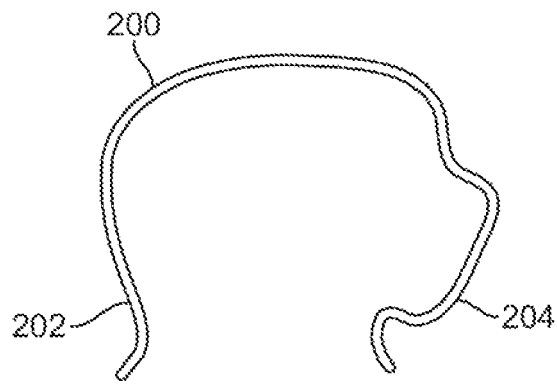
FIGS. 19A and 19B illustrate yet another variation of an oral appliance made from a shape memory material in its pre-formed relaxed configuration and its deformed configuration when placed over or upon the patient's tooth, respectively, to create an interference fit.
Figure 19B:
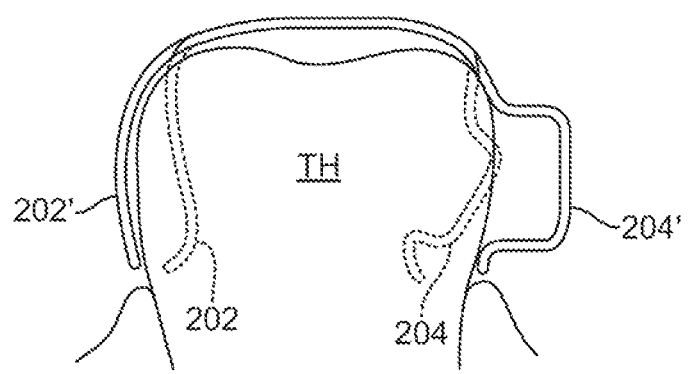

In yet another variation, FIGS. 19A and 19B illustrate an oral appliance 200 which may be pre-formed from a shape memory polymer or alloy or a superelastic material such as a Nickel—Titanium alloy, e.g., Nitinol. FIG. 19A shows oral appliance 200 in a first configuration where members 202, 204 are in an unbiased memory configuration. When placed upon or against the tooth TH, members 202, 204 may be deflected into a second configuration where members 202', 204' are deformed to engage tooth TH in a secure interference fit, as shown in FIG. 19B. The biased member 204' may be utilized to press the electronics and/or transducer assembly contained therein against the tooth surface as well as to maintain securement of the oral appliance 200 upon the tooth TH.

Similarly, as shown in FIG. 20, removable oral appliance 210 may have biased members to secure engage the tooth TH, as above. In this variation, the ends of the members 212, 214 may be configured into curved portions under which a transducer element 218 coupled to electronics assembly 216 may be wedged or otherwise secured to ensure mechanical contact against the tooth surface.

Figure 21:
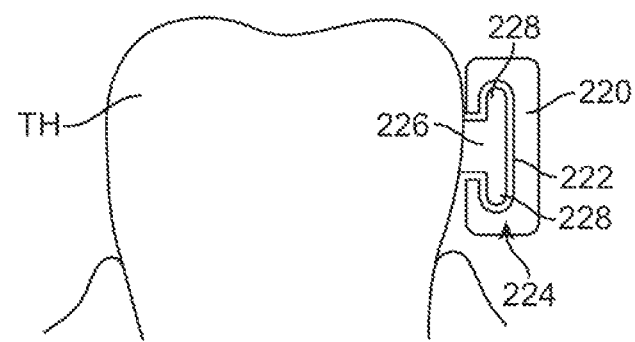
FIG. 21 illustrates a variation in which the oral appliance may be omitted and the electronics and/or transducer assembly may be attached to a composite dental anchor attached directly to the tooth surface.

FIG. 21 shows yet another variation in which the oral appliance is omitted entirely. Here, a composite dental anchor or bracket 226, as described above, may be adhered directly onto the tooth surface. Alternatively, bracket 226 may be comprised of a biocompatible material, e.g., stainless steel, Nickel—Titanium, Nickel, ceramics, composites, etc., formed into a bracket and anchored onto the tooth surface. The bracket 226 may be configured to have a shape 228 over which an electronics and/or transducer assembly 220 may be slid over or upon via a channel 222 having a corresponding receiving configuration 224 for engagement with bracket 226. In this manner, assembly 220 may be directly engaged against bracket 226, through which a transducer may directly vibrate into the underlying tooth TH. Additionally, in the event that assembly 220 is removed from the tooth TH, assembly 220 may be simply slid or rotated off bracket 226 and a replacement assembly may be put in its place upon bracket 226.

Figure 22A:
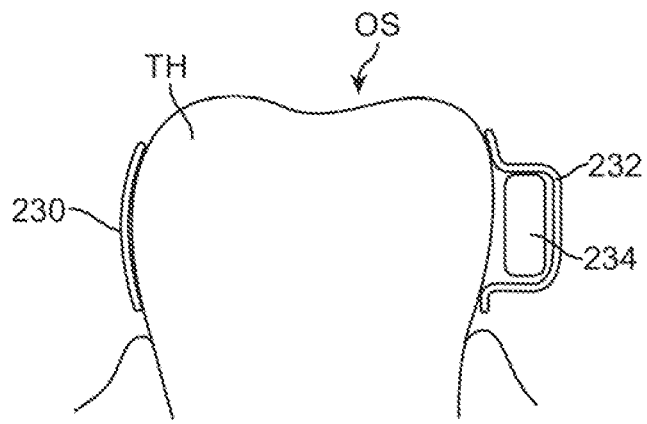
FIGS. 22A and 22B show partial cross-sectional side and perspective views, respectively, of another variation of an oral appliance assembly having its occlusal surface removed or omitted for patient comfort.
Figure 22B:
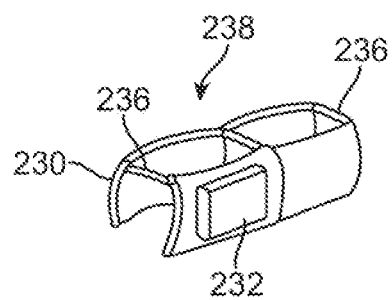

FIGS. 22A and 22B show partial cross-sectional side and perspective views, respectively, of yet another variation of an oral appliance 230. In this variation, the oral appliance 230 may be configured to omit an occlusal surface portion of the oral appliance 230 and instead engages the side surfaces of the tooth TH, such as the lingual and buccal surfaces only. The electronics and/or transducer assembly 234 may be contained, as above, within a housing 232 for Contact against the tooth surface. Additionally, as shown in FIG. 22B, one or more optional cross-members 236 may connect the side portions of the oral appliance 230 to provide some structural stability when placed upon the tooth. This variation may define an occlusal surface opening 238 such that when placed upon the tooth, the user may freely bite down directly upon the natural occlusal surface of the tooth unobstructed by the oral appliance device, thereby providing for enhanced comfort to the user.

Figure 23A:
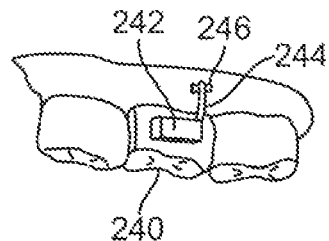
FIGS. 23A and 23B illustrate perspective and side views, respectively, of an oral appliance which may be coupled to a screw or post implanted directly into the underlying bone, such as the maxillary or mandibular bone.
Figure 23B:
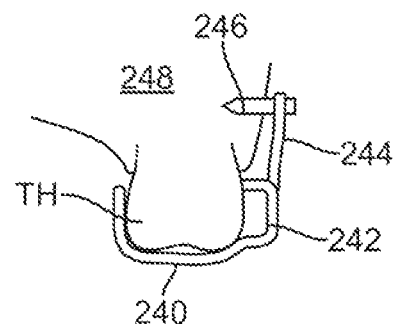

In yet other variations, vibrations may be transmitted directly into the underlying bone or tissue structures rather than transmitting directly through the tooth or teeth of the user. As shown in FIG. 23A, an oral appliance 240 is illustrated positioned upon the user's tooth, in this example upon a molar located along the upper row of teeth. The electronics and/or transducer assembly 242 is shown as being located along the buccal surface of the tooth. Rather than utilizing a transducer in contact with the tooth surface, a conduction transmission member 244, such as a rigid or solid metallic member, may be coupled to the transducer in assembly 242 and extend from oral appliance 240 to a post or screw 246 which is implanted directly into the underlying bone 248, such as the maxillary bone, as shown in the partial cross-sectional view of FIG. 23B. As the distal end of transmission member 244 is coupled directly to post or screw 246, the vibrations generated by the transducer may be transmitted through transmission member 244 and directly into post or screw 246, which in turn transmits the vibrations directly into and through the bone 248 for transmission to the user's inner ear.

Figure 24:
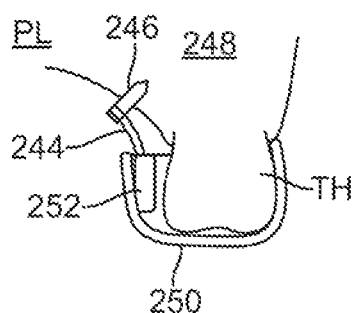
FIG. 24 illustrates another variation in which the oral appliance may be coupled to a screw or post implanted directly into the palate of a patient.

FIG. 24 illustrates a partial cross-sectional view of an oral appliance 250 placed upon the user's tooth TH with the electronics and/or transducer assembly 252 located along the lingual surface of the tooth. Similarly, the vibrations may be transmitted through the conduction transmission member 244 and directly into post or screw 246, which in this example is implanted into the palatine bone PL. Other variations may utilize this arrangement located along the lower row of teeth for transmission to a post or screw 246 drilled into the mandibular bone.

Figure 25A:
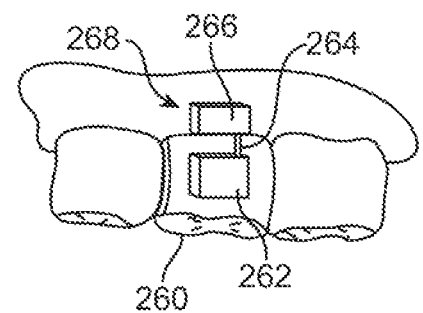
FIGS. 25A and 25B illustrate perspective and side views, respectively, of an oral appliance which may have its transducer assembly or a coupling member attached to the gingival surface to conduct vibrations through the gingival tissue and underlying bone.
Figure 25B:
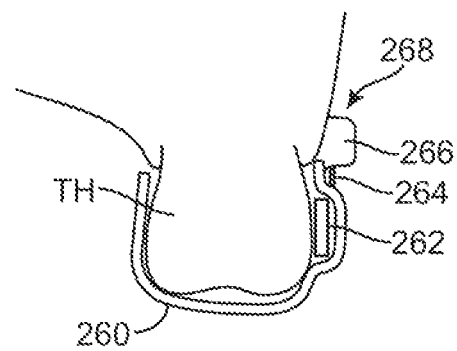

In yet another variation, rather utilizing a post or screw drilled into the underlying bone itself, a transducer may be attached, coupled, or otherwise adhered directly to the gingival tissue surface adjacent to the teeth. As shown in FIGS. 25A and 25B, an oral appliance 260 may have an electronics assembly 262 positioned along its side with an electrical wire 264 extending therefrom to a transducer assembly 266 attached to the gingival tissue surface 268 next to the tooth TH. Transducer assembly 266 may be attached to the tissue surface 268 via an adhesive, structural support arm extending from oral appliance 260, a dental screw or post, or any other structural mechanism. In use, the transducer may vibrate and transmit directly into the underlying gingival tissue, which may conduct the signals to the underlying bone.

Figure 26:
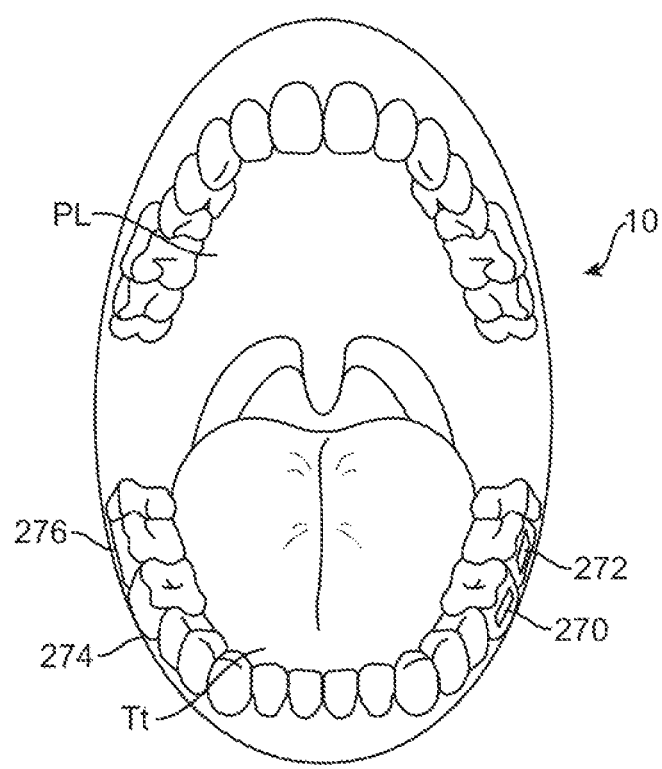
FIG. 26 illustrates an example of how multiple oral appliance two-way communication assemblies or transducers may be placed on multiple teeth throughout the patient's mouth.

For any of the variations described above, they may be utilized as a single device or in combination with any other variation herein, as practicable, to achieve the desired hearing level in the user. Moreover, more than one oral appliance device and electronics and/or transducer assemblies may be utilized at any one time. For example, FIG. 26 illustrates one example where multiple transducer assemblies 270, 272, 274, 276 may be placed on multiple teeth. Although shown on the lower row of teeth, multiple assemblies may alternatively be positioned and located along the upper row of teeth or both rows as well. Moreover, each of the assemblies may be configured to transmit vibrations within a uniform frequency range. Alternatively in other variations, different assemblies may be configured to vibrate within non-overlapping frequency ranges between each assembly. As mentioned above, each transducer 270, 272, 274, 276 can be programmed or preset for a different frequency response such that each transducer may be optimized for a different frequency response and/or transmission to deliver a relatively high-fidelity sound to the user.

Moreover, each of the different transducers 270, 272, 274, 276 can also be programmed to vibrate in a manner which indicates the directionality of sound received by the microphone worn by the user. For example, different transducers positioned at different locations within the user's mouth can vibrate in a specified manner by providing sound or vibrational queues to inform the user which direction a sound was detected relative to an orientation of the user. For instance, a first transducer located, e.g., on a user's left tooth, can be programmed to vibrate for sound detected originating from the user's left side. Similarly, a second transducer located, e.g., on a user's right tooth, can be programmed to vibrate for sound detected originating from the user's right side. Other variations and queues may be utilized as these examples are intended to be illustrative of potential variations.

Figure 27A:
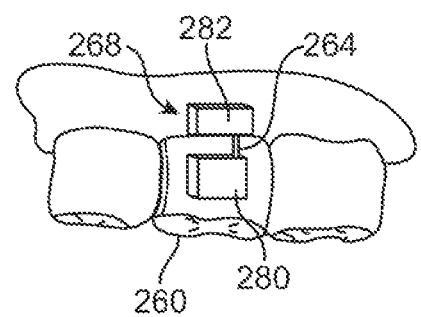
FIGS. 27A and 27B illustrate perspective and side views, respectively, of an oral appliance (similar to a variation shown above) which may have a microphone unit positioned adjacent to or upon the gingival surface to physically separate the microphone from the transducer to attenuate or eliminate feedback.
Figure 27B:
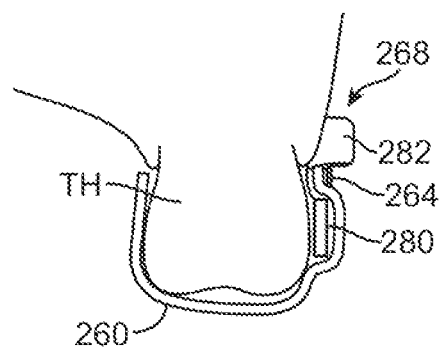

In variations where the one or more microphones are positioned in intra-buccal locations, the microphone may be integrated directly into the electronics and/or transducer assembly, as described above. However, in additional variation, the microphone unit may be positioned at a distance from the transducer assemblies to minimize feedback. In one example, similar to a variation shown above, microphone unit 282 may be separated from electronics and/or transducer assembly 280, as shown in FIGS. 27A and 27B. In such a variation, the microphone unit 282 positioned upon or adjacent to the gingival surface 268 may be electrically connected via wire(s) 264.

Figure 28:
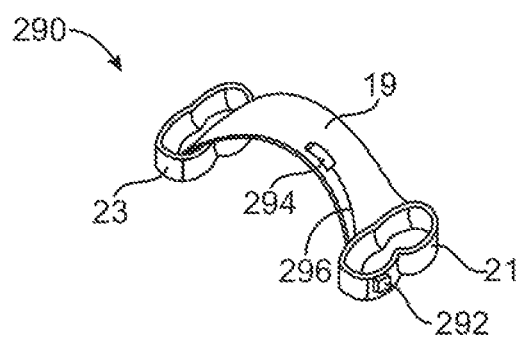
FIG. 28 illustrates another variation of a removable oral appliance supported by an arch and having a microphone unit integrated within the arch.

Although the variation illustrates the microphone unit 282 placed adjacent to the gingival tissue 268, unit 282 may be positioned upon another tooth or another location within the mouth. For instance, FIG. 28 illustrates another variation 290 which utilizes an arch 19 connecting one or more tooth retaining portions 21, 23, as described above. However, in this variation, the microphone unit 294 may be integrated within or upon the arch 19 separated from the transducer assembly 292. One or more wires 296 routed through arch 19 may electrically connect the microphone unit 294 to the assembly 292. Alternatively, rather than utilizing a wire 296, microphone unit 294 and assembly 292 may be wirelessly coupled to one another, as described above.

Figure 29:
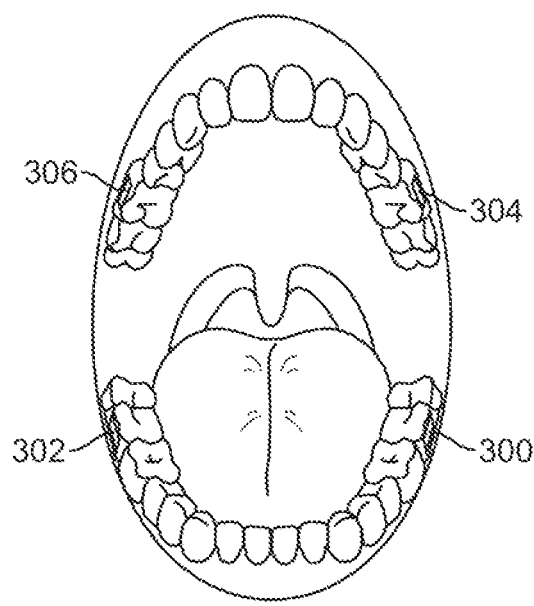
FIG. 29 shows yet another variation illustrating at least one microphone and optionally additional microphone units positioned around the user's mouth and in wireless communication with the electronics and/or transducer assembly.

In yet another variation for separating the microphone from the transducer assembly, FIG. 29 illustrates another variation where at least one microphone 302 (or optionally any number of additional microphones 304, 306) may be positioned within the mouth of the user while physically separated from the electronics and/or transducer assembly 300 in this manner, the one or optionally more microphones 302, 304, 306 may be wirelessly coupled to the electronics and/or transducer assembly 300 in a manner which attenuates or eliminates feedback, if present, from the transducer.

The applications of the devices and methods discussed above are not limited to the treatment of hearing loss but may include any number of further treatment applications. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A wireless headset adapted to communicate with a sound source, comprising:
   a. a bracket securable to at least one tooth;
   b. a mouth wearable communicator having a housing which is attachable to the bracket such that the mouth wearable communicator is vibrationally connected to the bracket;
   c. a linking unit coupled to the mouth wearable communicator, the linking unit adapted to communicate with the sound source;
   d. a first microphone to pick up body conduction sound;
   e. a second microphone to pick up ambient sound; and
   f. a noise canceller to subtract ambient sound from the body conduction sound.

2. The wireless headset of claim 1, wherein the mouth wearable communicator comprises a bone conduction transducer.

3. The wireless headset of claim 1, wherein the mouth wearable communicator comprises a custom oral device.

4. The wireless headset of claim 1, wherein the second microphone comprises an intraoral microphone or an extraoral microphone.

5. The wireless headset of claim 1, wherein the sound source comprises a telephone and wherein the second microphone cancels environmental noise and transmits a user's voice through the telephone.

6. The wireless headset of claim 1, wherein the sound source comprises one of: a music player, a video player, a cellular telephone, a computer, a one-way communication device, a two-way communication device, a wireless hands-free communication device.

7. The wireless headset of claim 1, wherein the mouth wearable communicator comprises a data storage device.

8. The wireless headset of claim 1, comprising:
   an actuatable transducer disposed within or upon the housing and in vibratory communication with a surface of the at least one tooth; and
   a wireless communication transceiver coupled to the transducer to provide received sound to the user and to provide communication for the user.

9. The wireless headset of claim 1, further comprising an oral appliance having a shape which conforms to the at least one tooth.

10. The wireless headset of claim 1, wherein the communicator includes a transducer, comprising an electronic assembly disposed within or upon the housing and in communication with the transducer.

11. The wireless headset of claim 1, wherein the linking unit comprises a transceiver compatible with one of: an 802 protocol, cellular protocol, Bluetooth protocol.

12. A method for communicating with a portable appliance, comprising:
   a. providing a wireless headset having a mouth wearable communicator having a housing which is attachable to a bracket secured to at least one tooth such that the mouth wearable communicator is vibrationally connected to the bracket;
   b. intraorally wearing the mouth wearable communicator; and
   c. linking the mouth wearable communicator to the portable appliance, the wireless headset further including a first microphone to pick up body conduction sound, a second microphone to pick up ambient sound, and a noise canceller to subtract ambient sound from the body conduction sound.

13. The method of claim 12, further comprising transmitting sound through the at least one tooth using a bone conduction device.

14. The method of claim 12, wherein providing a wireless headset comprises providing the mouth wearable communicator as a custom oral device.

15. The method of claim 12, wherein the second microphone comprises a directional microphone.

16. The method of claim 12, wherein the second microphone comprises a noise cancelling microphone.

17. The method of claim 12, wherein the portable appliance is configured to receive short-range transmission from the mouth wearable communicator and relay the transmission over a wide area network.

18. The method of claim 12, further comprising transmitting sound through a tooth, a maxillary bone, a mandibular bone, or a palatine bone.

* * * * *